(12) United States Patent
Johnson et al.

(10) Patent No.: US 8,095,366 B2
(45) Date of Patent: Jan. 10, 2012

(54) FONTS WITH FEELINGS

(75) Inventors: Margaret K. Johnson, Kirkland, WA (US); Heinz W. Schuller, Bellevue, WA (US); Howard W. Phillips, Woodinville, WA (US); Michel Pahud, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 11/390,513

(22) Filed: Mar. 27, 2006

(65) Prior Publication Data

US 2007/0226641 A1    Sep. 27, 2007

(51) Int. Cl.
G10L 11/00 (2006.01)
G10L 13/08 (2006.01)
G06F 3/00 (2006.01)
G06T 11/00 (2006.01)

(52) U.S. Cl. ......... 704/270; 704/260; 715/705; 345/471
(58) Field of Classification Search .................. None
See application file for complete search history.

(56) References Cited

U.S. PATENT DOCUMENTS

| | | | |
|---|---|---|---|
| 4,710,877 A | 12/1987 | Ahmed | |
| 5,636,340 A * | 6/1997 | Bonneau et al. | 715/201 |
| 5,715,473 A * | 2/1998 | Reed | 715/210 |
| 5,774,109 A | 6/1998 | Winksy et al. | |
| 5,907,706 A | 5/1999 | Brodsky et al. | |
| 6,126,447 A | 10/2000 | Engelbrite | |
| 6,157,924 A | 12/2000 | Austin | |
| 6,230,169 B1 | 5/2001 | Nagae | |
| 6,230,170 B1 | 5/2001 | Zellweger et al. | |
| 6,281,897 B1 | 8/2001 | Berry et al. | |
| 6,404,435 B1 | 6/2002 | Miller et al. | |
| 6,504,545 B1 | 1/2003 | Browne et al. | |
| 6,513,160 B2 | 1/2003 | Dureau | |
| 6,517,351 B2 | 2/2003 | Spector | |
| 6,519,566 B1 | 2/2003 | Boyer et al. | |
| 6,584,479 B2 | 6/2003 | Chang et al. | |
| 7,149,690 B2 * | 12/2006 | August et al. | 704/270 |

(Continued)

FOREIGN PATENT DOCUMENTS

WO    9314844 A1    8/1993

(Continued)

OTHER PUBLICATIONS

Curtis, Polly "New typeface to help with dyslexia", Webpage Available at http://education.guardian.co.uk/schools/story/0,5500,1462551,00.html, Retrieved on Oct. 26, 2005, Published on Apr. 18, 2005, 3 pages.

(Continued)

Primary Examiner — Matthew Sked

(57) ABSTRACT

Various technologies and techniques are disclosed that improve the instructional nature of fonts and/or the ability to create instructional fonts. Font characters are modified based on user interaction to enhance the user's understanding and/or fluency of the word. The font characters can have sound, motion, and altered appearance. When altering the appearance of the characters, the system operates on a set of control points associated with characters, changes the position of the characters, and changes the influence of the portion of characters on a set of respective spline curves. A designer or other user can customize the fonts and user experience by creating an episode package that specifies words to include in the user interface, and details about actions to take when certain events fire. The episode package can include media effects to play when a particular event associated with the media effect occurs.

18 Claims, 27 Drawing Sheets

U.S. PATENT DOCUMENTS

| | | | |
|---|---|---|---|
| 7,181,692 B2 * | 2/2007 | Siegel | 715/727 |
| 7,194,411 B2 * | 3/2007 | Slotznick et al. | 704/271 |
| 7,194,693 B2 * | 3/2007 | Cragun et al. | 715/747 |
| 7,400,422 B2 * | 7/2008 | Brown et al. | 358/1.14 |
| 7,441,190 B2 | 10/2008 | Asami | |
| 7,730,403 B2 | 6/2010 | Johnson et al. | |
| 2002/0049590 A1 * | 4/2002 | Yoshino et al. | 704/241 |
| 2003/0110149 A1 | 6/2003 | Wen et al. | |
| 2003/0195024 A1 | 10/2003 | Slattery | |
| 2004/0004613 A1 | 1/2004 | Adler | |
| 2004/0023195 A1 | 2/2004 | Wen et al. | |
| 2004/0075670 A1 | 4/2004 | Bezine et al. | |
| 2004/0139156 A1 | 7/2004 | Matthews et al. | |
| 2004/0221224 A1 | 11/2004 | Blattner et al. | |
| 2005/0120308 A1 * | 6/2005 | Gibson et al. | 715/779 |
| 2005/0175970 A1 | 8/2005 | Dunlap et al. | |
| 2005/0228736 A1 * | 10/2005 | Norman et al. | 705/37 |
| 2005/0255431 A1 * | 11/2005 | Baker | 434/169 |
| 2006/0053372 A1 | 3/2006 | Adkins et al. | |
| 2006/0227142 A1 * | 10/2006 | Brown et al. | 345/473 |
| 2007/0003913 A1 * | 1/2007 | Rosenberg | 434/156 |
| 2007/0079239 A1 | 4/2007 | Ghassabian | |

FOREIGN PATENT DOCUMENTS

| | | |
|---|---|---|
| WO | 03104936 A2 | 12/2003 |

OTHER PUBLICATIONS

Aist, Gregory, "Helping Children Learn Vocabulary during Computer-Assisted Oral Reading", Educational Technology & Society, ISSN 1436-4522, Webpage Available at http://ifets.ieee.org/periodical/vol_2_2002/aist.html, Retrieved on Oct. 26, 2005, Published on May 2, 2002, 22 pages.

"Block Letters Handwriting school fonts to teach and learn the written language with ease", School fonts: Cursive handwriting, block letters D'Nealian and Zaner-Bloser, Webpage Available at http://www.schoolfonts.com/, Retrieved on Oct. 26, 2005, 2 pages.

Breckinridge, Joel, "GaijiMaster", Rickford Macintouch Special Reports, Webpage Available at http://www.macintouch.com/gaiji.html, Retrieved on Oct. 26, 2005, Feb. 5, 2000, 4 pages.

Kerman, Phillip, "SAMS Teach Yourself Macromedia Flash 5 in 24 Hours", SAMS, pp. 273-276, 2001.

Kerman, Phillip, "SAMS Teach Yourself Macromedia Flash 5 in 24 Hours", SAMS, pp. 294-297, 2001.

* cited by examiner

480

Once upon a time
a dragon flew over
a beach

Once upon a time
adragonflew over
a beach

Once upon a time
adragonflew over
a beach

Once upon a time
dragonover
A beach

```xml
<!-- Definition of the tags for the text -->
  <tagDefine>
    <tag name="laughing">
      <hover>
      <scale width="+10%" height="+20%" sfx="stretch.wav" />
      </hover>
      <inlineEvent name="pointing">
       <sinusoid direction="horiz" amplitude = "3" period = "50"
          duration = "100" repetition="2" sfx="laugh.wav" />
      </inlineEvent>
      <speechEvent wordRecognized="true">
       <sinusoid direction="horiz" amplitude = "7" period = "30"
          duration = "400" repetition="2" sfx="howdy.wav" />
      </speechEvent>
    </tag>
  </tagDefine>
    <!-- Fontlings sign text -->
      <text>
        <laughing>DANGER Bees</laughing>
      </text>
```

FIG. 20

FONTS WITH FEELINGS

BACKGROUND

Today's PC fonts are optimized for use by knowledge workers. They do an excellent job at using content weightings such as bold, underlining, or italics, and supporting other information structures. For children and other users struggling to read and write on a computer device, fonts for productivity do nothing to aid their struggle. For example, productivity fonts do not engage the children and help them understand the letters, words, and numbers they represent. Furthermore, in order for word interactivity to be added to programs, a developer must typically write software code to handle the specific interactive circumstances. Font designers and educators do not have the ability to provide interactivity to the fonts in a customizable fashion.

SUMMARY

Various technologies and techniques are disclosed that improve the instructional nature of fonts and/or the ability to create instructional fonts. In one implementation, font characters are modified to engage the user and/or enhance the user's understanding or fluency of the word and/or number as the user interacts with the word and/or number. Non-limiting examples of user interaction with words include selecting characters or speaking a word associated with the characters. The characters are modified in one of various ways, such as by altering their appearance, playing sounds associated with them, making the characters appear to be in motion, and so on. In one implementation, when altering the appearance of the characters, the system operates on a set of control points associated with characters, changes the position of the characters, and changes the influence of the portion of characters on a set of respective spline curves.

In another implementation, output is produced as the user interacts with the characters. A few non-limiting examples of output include a phoneme pronunciation of the word, a normal pronunciation of the word, a pictogram of the word, a multimedia representation of the word, and a designed effect for the word. A set of data related to the interaction with the word by the user is stored in a data store. This interaction data can be used to determine what type of output to provide to the user.

In yet another implementation, a designer, educator, or other user can customize the fonts and user experience by creating an experience or episode package. The experience or episode package contains one or more files and/or database fields that specify some of the words to include in the user interface, and/or details about what actions to take when certain events are fired. The experience or episode package can also include one or more media files, such as audio files, that should be played to the user when a particular event that is associated with the media file occurs. In one implementation, the media files are provided to enhance the user's understanding and/or fluency of the associated word.

This Summary was provided to introduce a selection of concepts in a simplified form that are further described below in the Detailed Description. This Summary is not intended to identify key features or essential features of the claimed subject matter, nor is it intended to be used as an aid in determining the scope claimed subject matter.

BRIEF DESCRIPTION OF THE DRAWINGS

FIGS. 14-17 are simulated screens for one implementation of the system of FIG. 2 illustrating variations of the sizing and placement of words based on user interaction.

FIG. 20 is a diagram illustrating a sample text file for one implementation of the system of FIG. 2.

DETAILED DESCRIPTION

Figure 1:
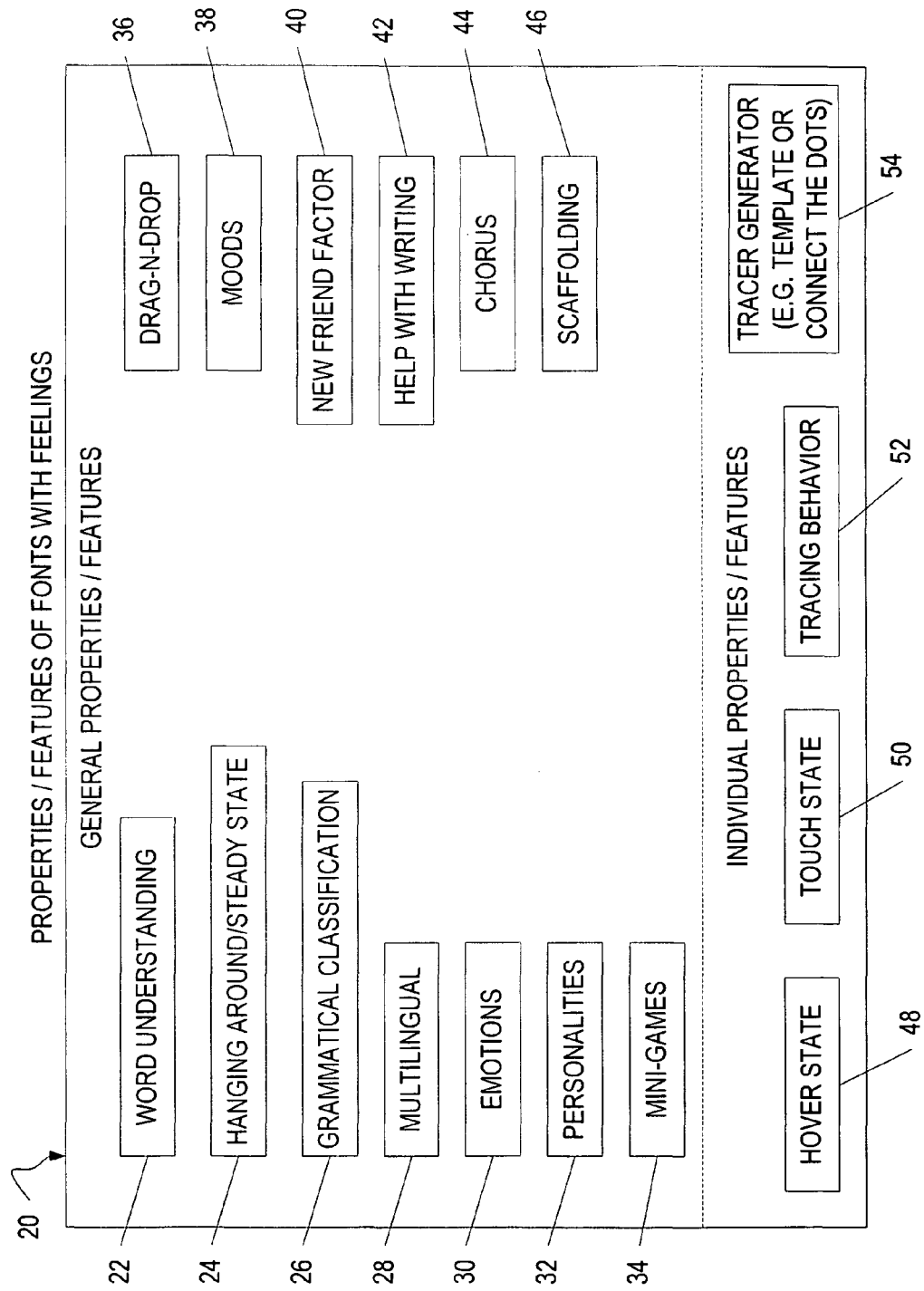
FIG. 1 is a diagrammatic view of the properties available in an application operating on a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

Shown in FIG. 1 are exemplary properties and/or features 20 of one implementation of a system that improves the instructional nature of fonts. These properties and/or features are only illustrative in nature of the types of features that can be used with fonts to improve their instructional nature. However, some, all, fewer, or none of these properties and/or features are used in other implementations. Furthermore, while some properties and/or features on FIG. 1 are shown to be general properties and others individual properties, other variations could also be used. As a few non-limiting examples, any of the general properties could be individual properties, any of the individual properties could be general properties, and/or the properties could be neither individual nor general properties. The word understanding property 22 is used to help the user, such as a child, gain a better understanding of the meaning of a particular word or words. The hanging around/steady state property 24 gives the user the impression the fonts are breathing. The grammatical classification property 26 identifies a word type, such as noun, adjective, or adverb. The multilingual property 28 allows the words to be provided in multiple languages.

The emotions property 30 gives the user the impression the fonts have emotions. The personalities property 32 gives the user the impression the fonts have personalities. The minigames property 34 allows the font to have interactive games associated with it to make the experience more fun and/or improve the word understanding. The drag-n-drop property 36 allows the fonts to take on certain characteristics when they are dragged and dropped on the screen. The moods property 38 gives the user the impression the fonts have moods. The new friend factor property 40 keeps track of the how much attention the font has received and increases or decreases responsiveness accordingly. The help with writing property 42 allows the fonts to communicate with input devices to specify what type of writing instrument is most appropriate. The chorus property 44 tracks when an exact copy of a particular font is active and can provide a display of similar behaviors in a chorus fashion. The scaffolding property 46 tracks the proficiency of the user with a particular word and responds to the user's interaction based on the level of proficiency.

The hover state property 48 is used with input devices that support hovering, such as a stylus, to modify the appearance or other characteristic of the font. The touch state property 50 is enacted when the font is touched, and modifies the appearance of the font, such as size and/or color. The tracing behavior property 52 includes a set of tracing rules that can apply when the user starts tracing one of the fonts. The tracer generator property 54 allows fonts to be traced, such as using a template or a connect-the-dots view. In one implementation, behaviors and/or other properties can be set at the character level, at the word level and/or at the group of words level. Similarly, in some implementations, behaviors and/or other properties can be set for single digit number, operators, multiple digit numbers, and/or a group of numbers with or without operators, such as for science or math learning. In some implementations, behaviors and/or properties can also be set for a mix between numbers, characters, words, and/or operators. Each of these exemplary properties and/or features will be described in further detail in the figures that follow.

Figure 2:
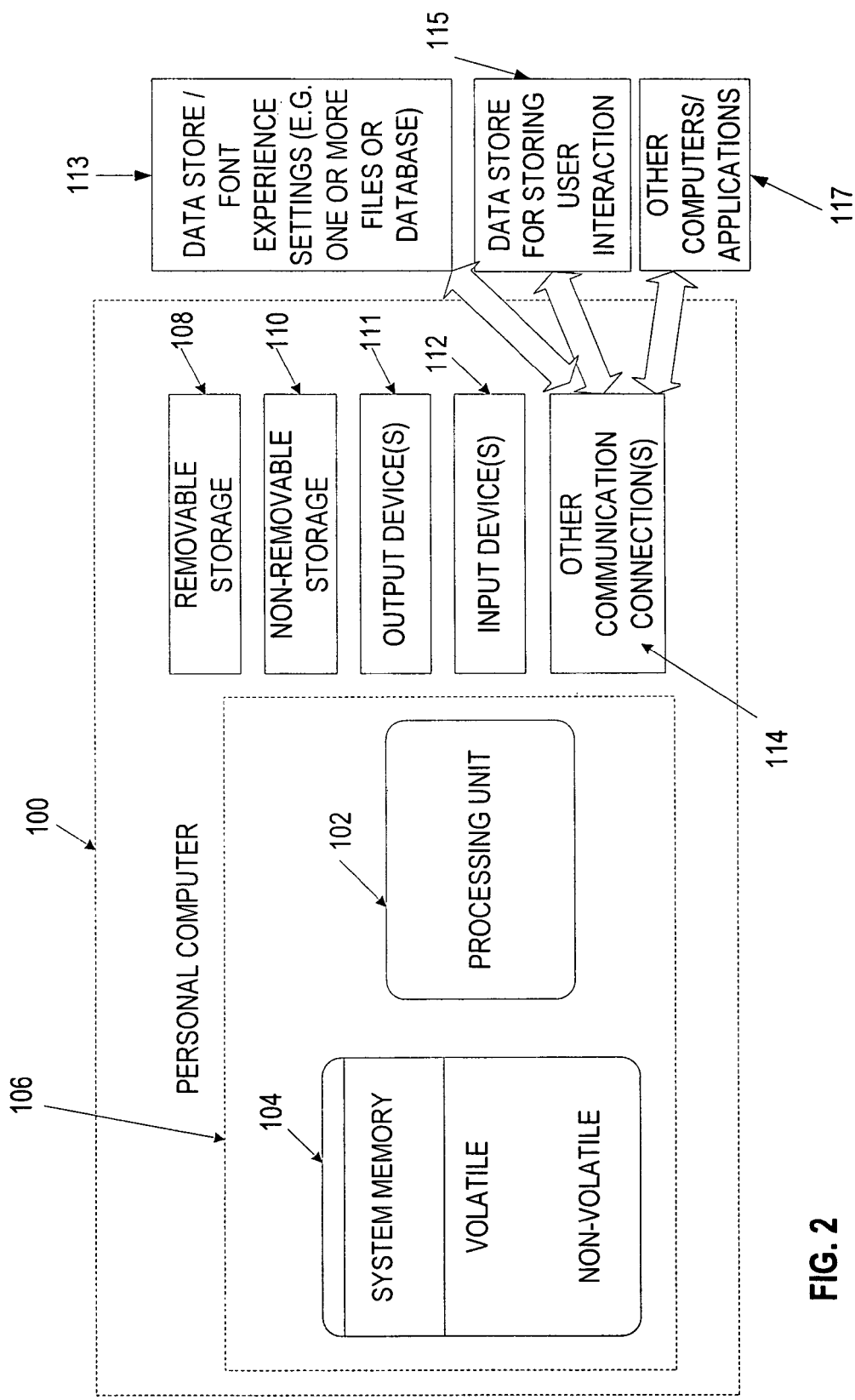
FIG. 2 is a diagrammatic view of a computer system of one implementation.

As shown in FIG. 2, an exemplary computer system to use for implementing one or more parts of the system includes one or more computing devices, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections that allow computing device 100 to communicate with data store/font experience settings (such as one or more files or a database) 113, data store 115 for storing user interaction, and/or other computers/applications 117. In one implementation, data store/font experience settings 113 are contained in an experience or episode package. Data stores 113 and/or 115 can be located on computing device 100 or on a separate computing device. Communications connection(s) 114 are examples of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 100 may also have input device(s) 112 such as keyboard, mouse, pen, voice input device, touch input device, vision, and various other types of devices that receive input. Output device(s) 111 such as a display, speakers, printer, etc. may also be included. These devices are well known in the art and need not be discussed at length here.

Figure 3:
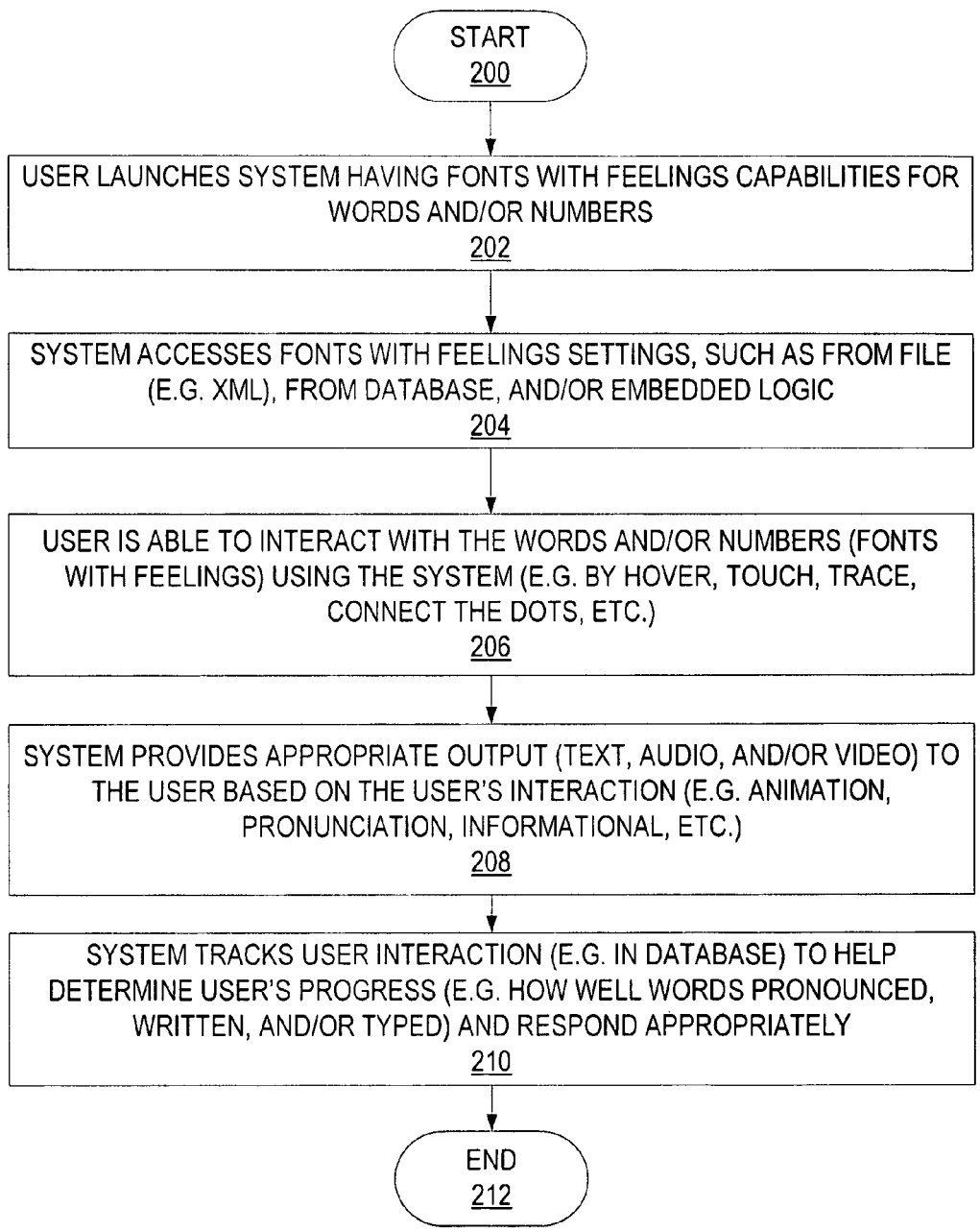
FIG. 3 is a high-level process flow diagram for one implementation of the system of FIG. 2.
Figure 4:
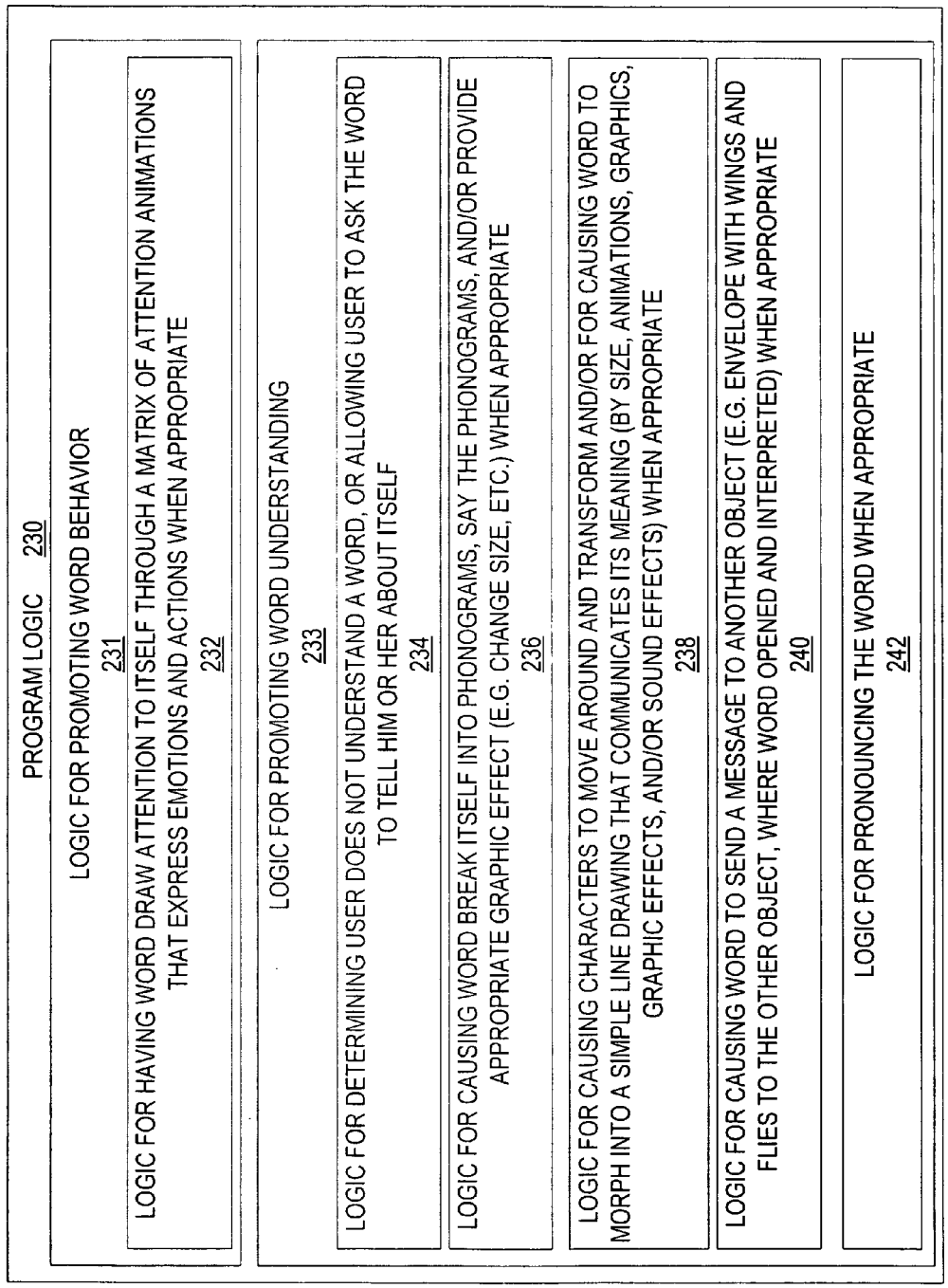
FIGS. 4-8 are diagrams for one implementation of the system of FIG. 2 illustrating program logic that executes at the appropriate times to implement one or more techniques for the system.

Turning now to FIG. 3, with continued reference to FIG. 2, a flow diagram illustrating the operation of one or more features of one implementation of system 100 from the user's perspective is described. FIG. 3 is a high-level process flow diagram for one implementation. In one form, the process of FIG. 3 is at least partially implemented in the operating logic of computing device 100. The process begins at start point 200 with the user launching the system having fonts with feelings capabilities for words and/or numbers (stage 202).

The system accesses fonts with feelings settings, such as from a file (e.g. XML), from a database, and/or from embedded logic (stage 204). The user is able to interact with the words and/or numbers (fonts with feelings) using the system, such as by hover, touch, trace, connect-the-dots, etc. (stage 206). The system provides appropriate output (text, audio, and/or video) to the user based on the user's interaction (stage 208). In one implementation, the output is modified by operating on a set of control points associated with the words, changing character position, and changing an influence of the characters on a set of respective spline curves (stage 208). A few non-limiting examples of output that can be provided include animation, pronunciation, and/or informational output (stage 208). In one implementation, one or more of the technologies and techniques discussed in detail herein are used to help improve a user's word understanding and/or fluency. In other implementations, one or more of these technologies and techniques are used to improve a user's understanding and/or fluency of numbers, such as when helping the user learn to draw and/or pronounce numbers, perform mathematical operations on numbers, and so on.

The system tracks the user's interaction, such as in a database, to help determine the user's progress and responds appropriately (stage 210). As a few non-limiting examples, the system tracks how well the user pronounces, writes, and/or types the words. The process then ends at end point 212.

FIGS. 4-8 are diagrams illustrating program logic that executes at appropriate times to implement one or more of the techniques described herein. Some, all, or additional logic than those described in FIGS. 4-8 can be included in one or more implementations. In one form, the procedures of FIGS. 4-8 are at least partially implemented in the operating logic of computing device 100. Program logic 230 includes logic 231 for promoting word behavior, such as logic 232 which allows the word to draw attention to itself through a matrix of attention animations that express emotions and actions.

When appropriate, logic 233 executes to promote word understanding. For example, logic 234 determines that the user does not understand a word, and/or for allows the user to ask the word to tell him or her about itself. Logic 236 causes the word to break itself into phonograms, say the phonograms, and/or provide appropriate graphic effects (e.g. change size, grow bigger, etc.). Another example of logic 233 for promoting word understanding includes logic 238 for causing the causing the characters to move around and transform and/or for causing the word to morph into a simple line drawing that communicates its meaning, such as by size, animations, graphics, graphic effects, and/or sound effects. As a few non-limiting examples, the word "giant" can get very large; the word "lion" can morph into a line drawing of a lion; the word "toss" can morph into a hand that animates a ball toss; the word "bees" could show bees flying around with or without a "buzz" sound effect; the word "DANGER" could have the "A" and "E" going up and becoming red and turning with the sound of a siren. Yet another example of logic 233 for promoting word understanding includes logic 240 for causing the word to send a message to another object, such as an envelope with wings that flies to the other object, where the word is opened and interpreted. Alternatively or additionally, the word can communicate with an object that is in the real-world, such as an envelope flying out of a computing device that controls a robot nearby and has a gesture of opening an envelope and interpreting the word. Logic 242 causes the word to be pronounced when appropriate.

Figure 5:
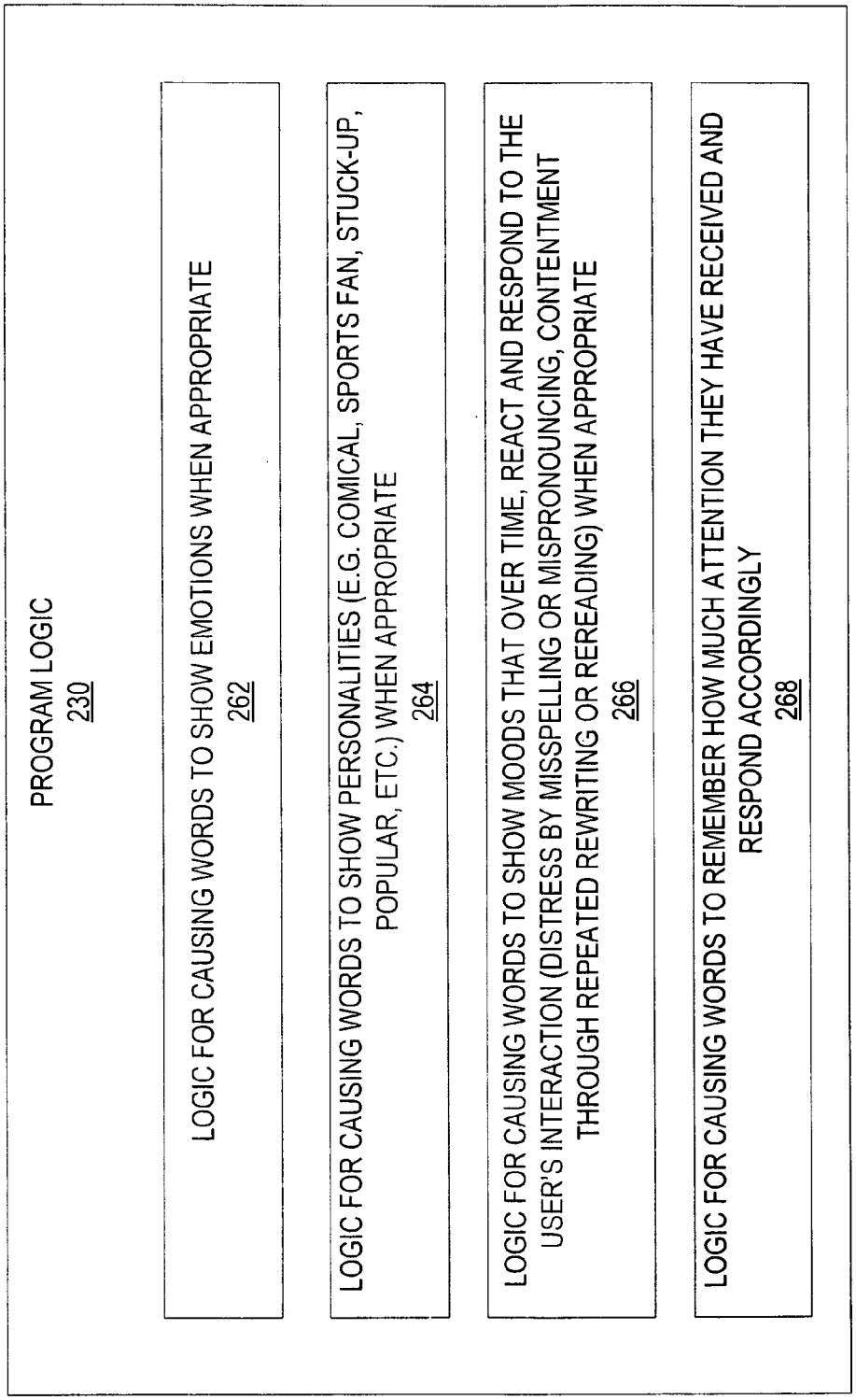

Turning now to FIG. 5, program logic 230 includes logic 262 for causing words to show emotions when appropriate. Logic 264 causes words to show personalities (e.g. comical, sports fan, stuck-up, popular, etc.) at appropriate times. Logic 266 causes the words show moods that over time, react and respond to the user's interaction. As a few non-limiting examples, the words can show distress when the user misspells or mispronounces, and/or the words can show contentment when the user repeatedly rewrites or rereads them. Logic 268 causes words to remember how much attention they have received and respond accordingly.

Figure 6:
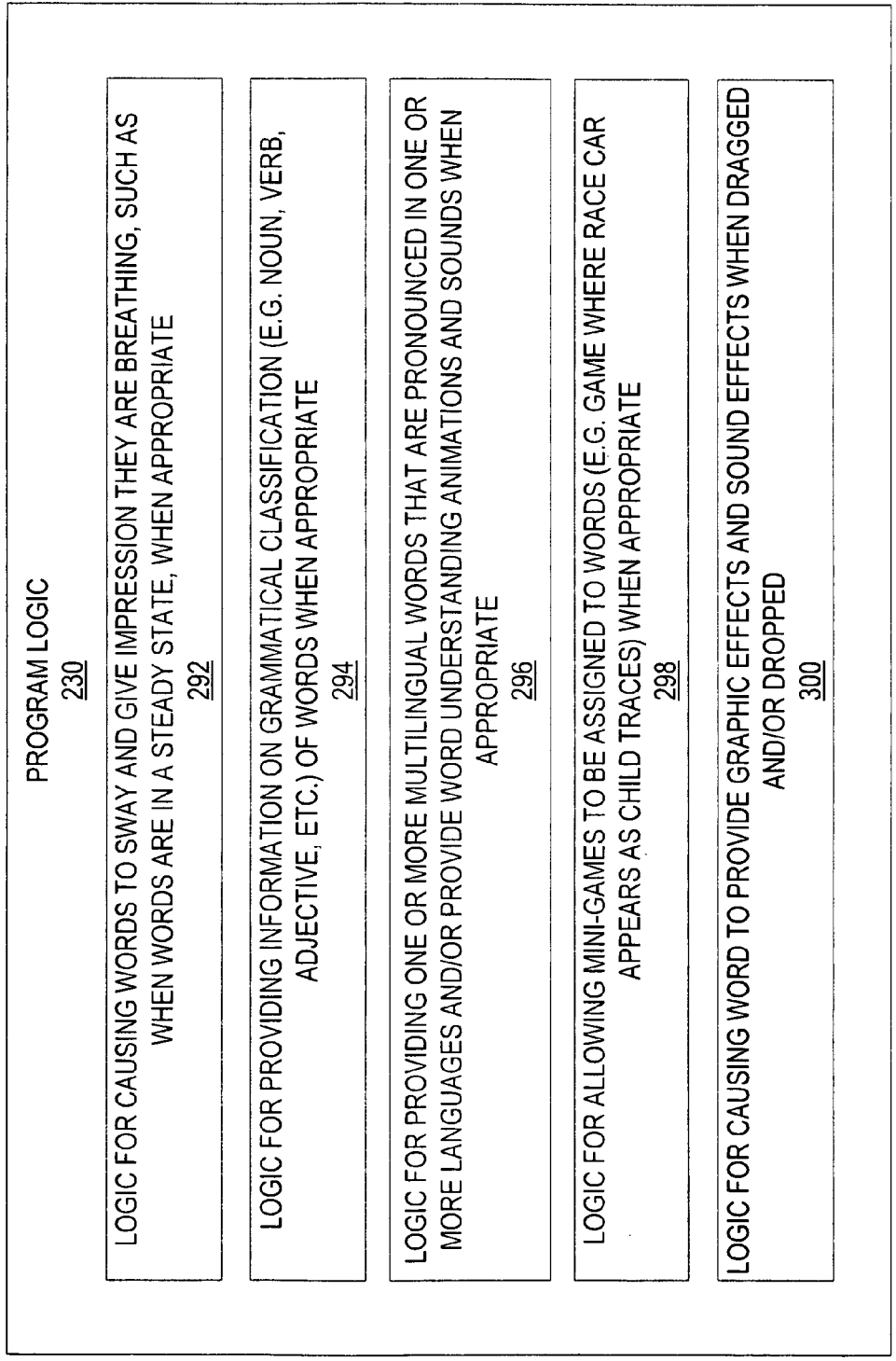

Turning now to FIG. 6, program logic 230 includes logic 292 for causing words to sway and give the impression they are breathing at the appropriate times, such as when they are in a steady state. In one implementation, filters can be applied to the steady state. For example, there might be a filter that gives the impression that the fonts are 6" under water.

Logic 294 causes the words to provide information on grammatical classification, such as whether they represent a noun, verb, adjective, adverb, etc. when appropriate. Logic 296 provides one or more words that are multilingual and can be pronounced in one or more languages and/or provides word understanding animations and sounds. Logic 298 allows the words to have mini-games assigned to them, such as a follow-along game where race cars appear as the user traces, to help aid the user in following along at the right speed and the right accuracy. As one non-limiting example, a racing game can be provided in which a racing car appears where the user should start tracing when the user taps on the letter. The user guides the racing car receiving wild applause and a score. Logic 300 causes the words to provide media effects (graphic effects and/or sound effects) when dragged and/or dropped. As a few non-limiting examples, sound and particle effects simulate being dragged through gravel, or across a blackboard with a "screeeech!"

Figure 7:
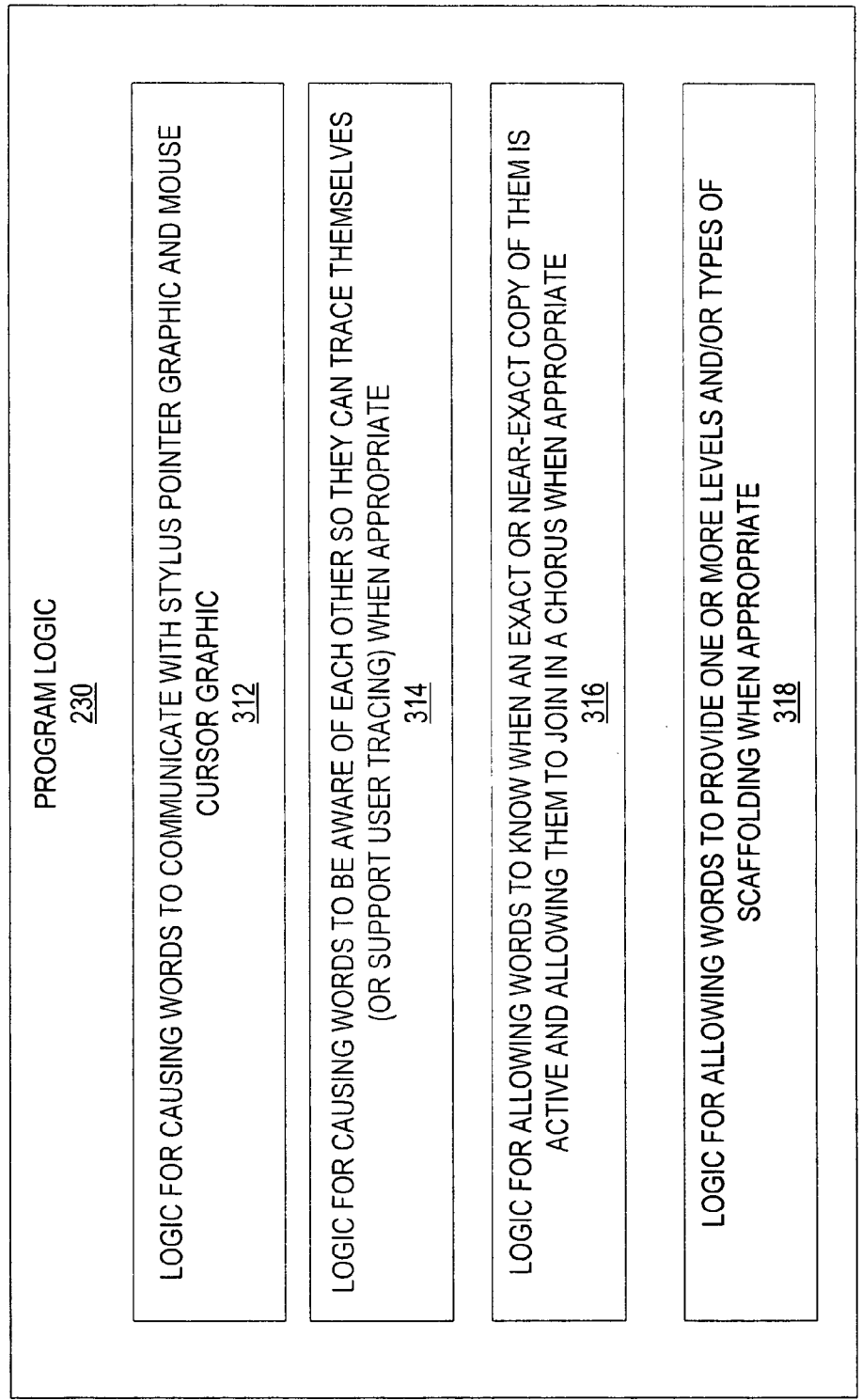

Turning now to FIG. 7, program logic 230 includes logic 312 for causing the words to communicate with a stylus pointer graphic and a mouse cursor graphic. Logic 314 causes the words to be aware of each other so they can trace themselves or support user tracing. As one non-limiting example, fonts are aware of each other such that they can trace themselves and without interruption, and hand off the tracing point to the next font in the word for seamless tracing.

Logic 316 allows the words or a subset of words to know when an exact or near-exact copy of them is active and can join in a chorus. As a few non-limiting examples, fonts know when an exact or near-exact copy (singular/plural, verb conjugation, etc) of them is active on a display and can "join in" in a chorus of slightly different but collectively congruous behaviors. For example, if the word "dragon" appears multiple times, each instance of the word "dragon" may perform the same or a separate action to draw attention and/or reinforce the understanding. A few additional non-limiting examples include simultaneously sounding themselves out "in harmony" or sequentially "doing the wave". Logic 318 allows the words to provide one or more varying levels and/or types of scaffolding depending on the user's understanding of the word, as described in detail in FIG. 28.

Figure 8:
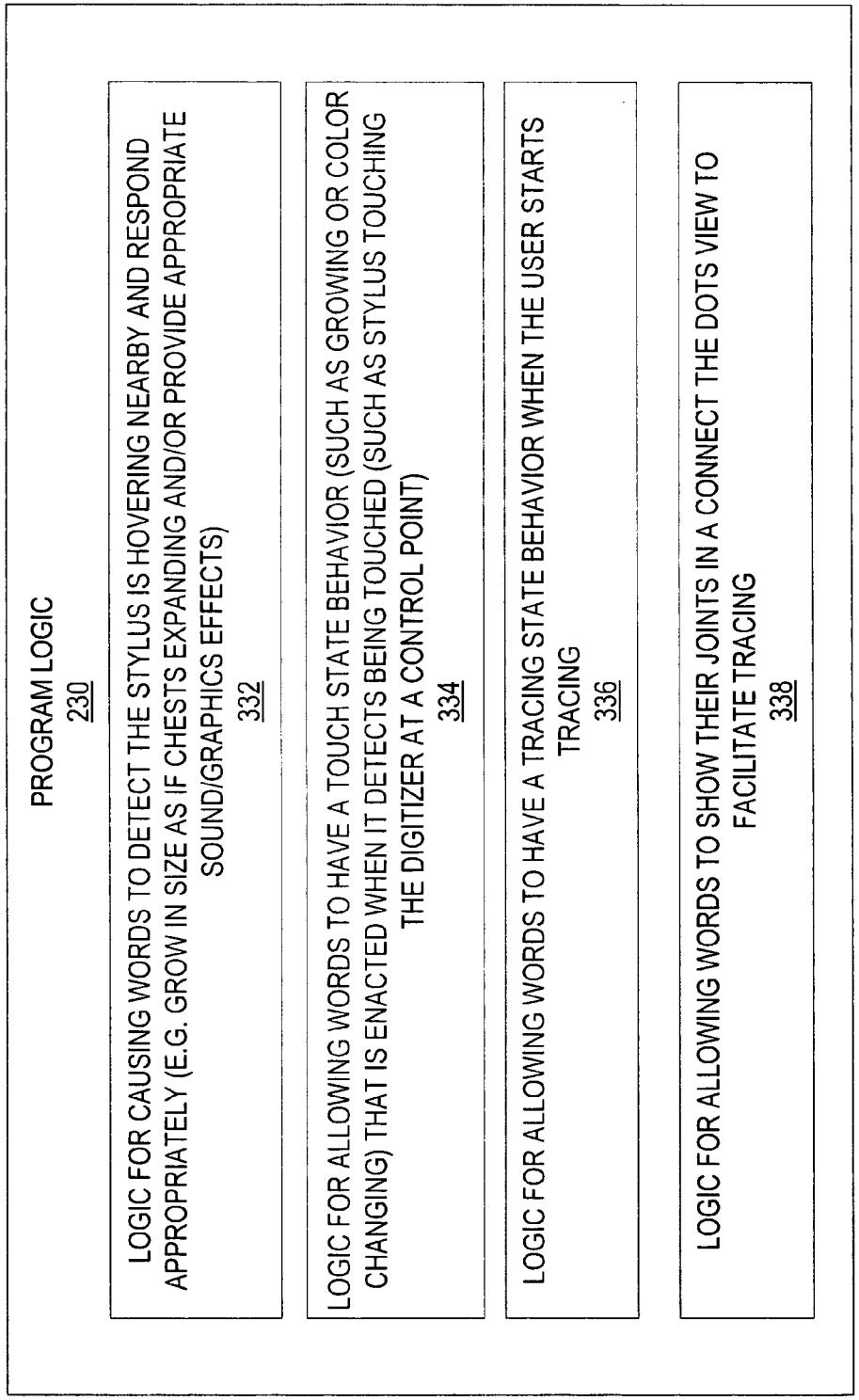

Turning now to FIG. 8, program logic 230 includes logic 332 for causing words to detect that the stylus is hovering nearby and respond appropriately, such as to grow in size as if their chest is expanding and/or provide appropriate sound and/or graphic effects. Logic 334 allows words to have a touch state behavior (such as growing or color changing) that is enacted when it detects being touched (such as by the stylus touching the digitizer at a control point). As one non-limiting example, one or more letters start to grow as the other surrounding letters shrink out of the way. Alternatively or additionally, the touch state behavior causes the color of the fonts to make them appear more concrete. Logic 336 allows the words to have a tracing state behavior when the user starts tracing, as described in detail in FIG. 9. Logic 338 allows the words to show their joints in a connect-the-dots view to facilitate tracing.

Figure 9:
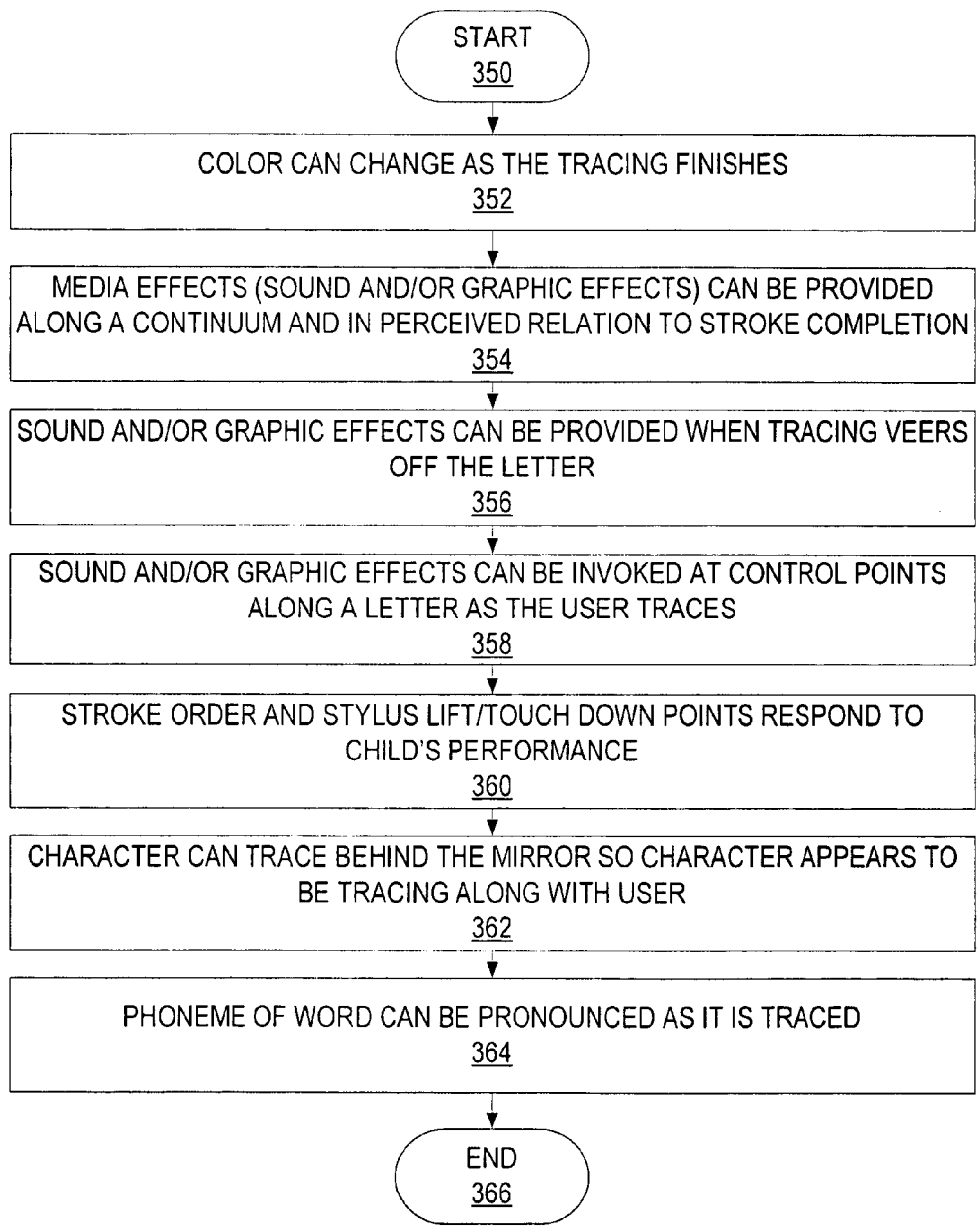
FIG. 9 is a process flow diagram for one implementation of the system of FIG. 2 illustrating the stages involved in tracing characters.

FIG. 9 illustrates the stages involved in tracing characters. Some, all, or fewer than these stages can be used to facilitate tracing. In one form, the process of FIG. 9 is at least partially implemented in the operating logic of computing device 100. The process begins at start point 350 with the color changing as the tracing finishes (stage 352). Media effects (sound and/or graphic effects) can be provided along a continuum and in perceived relation to the stroke completion (stage 354). The sound and/or graphic effects can be provided when tracing veers off the letter (stage 356). The sound and/or graphics effects can be invoked at control points along a letter as the user traces (stage 358).

The stroking order and stylus left/touch down points respond to the user's (e.g. child's) performance (stage 360). The character can trace behind the mirror so the character appears to be tracing along with the user (stage 362). As one non-limiting example, a character can trace "behind the mirror" of the display, such that as the user is tracing, a character appears to be tracing along with the user, only as if the character is tracing at the same point on the other side of a mirror. The phoneme of the word can be pronounced as it is traced (stage 364). The process then ends at end point 366.

Figure 10:
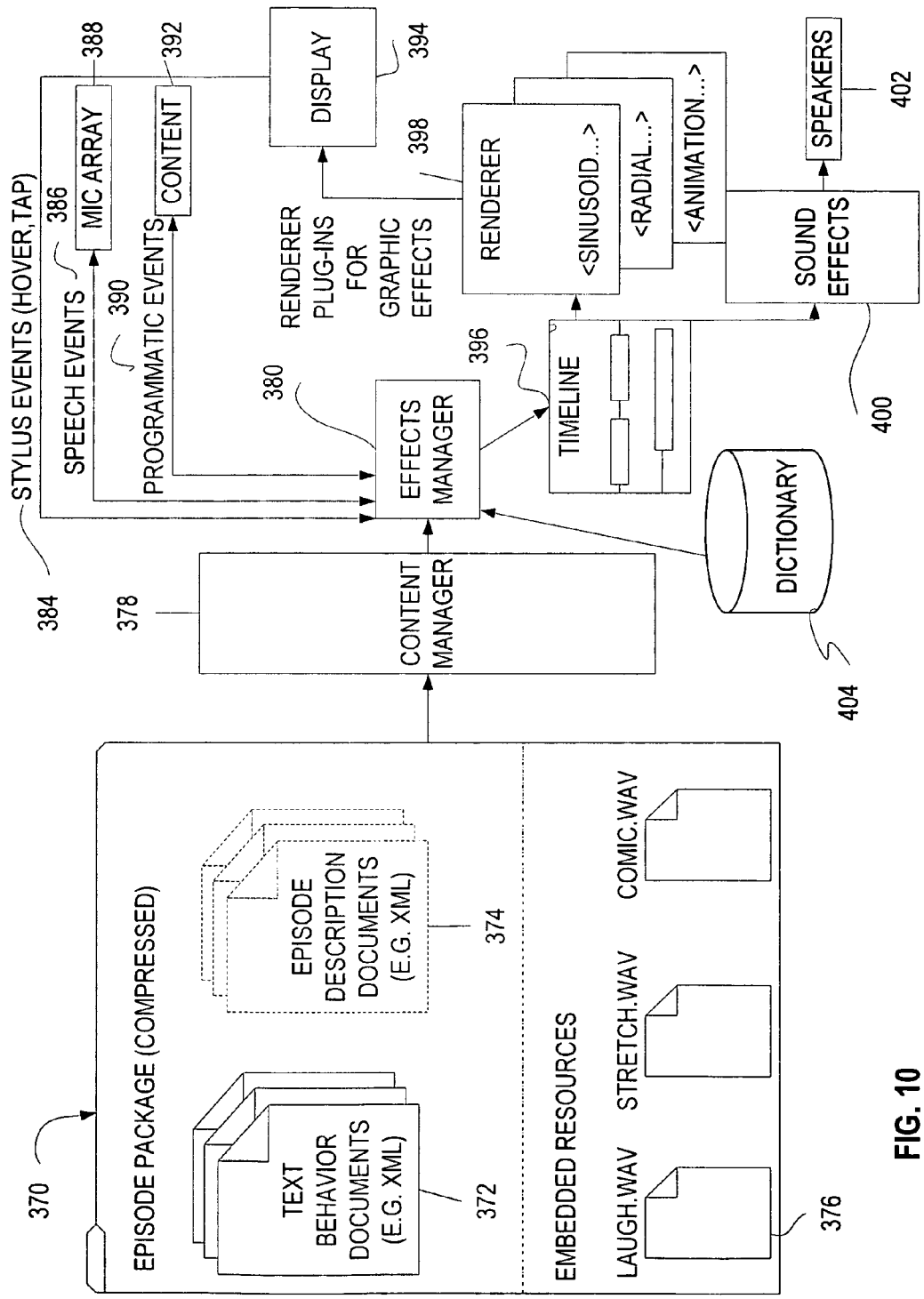
FIG. 10 is a diagrammatic view for one implementation of the system of FIG. 2 illustrating the components that allow customization of the user experience.
Figure 11:
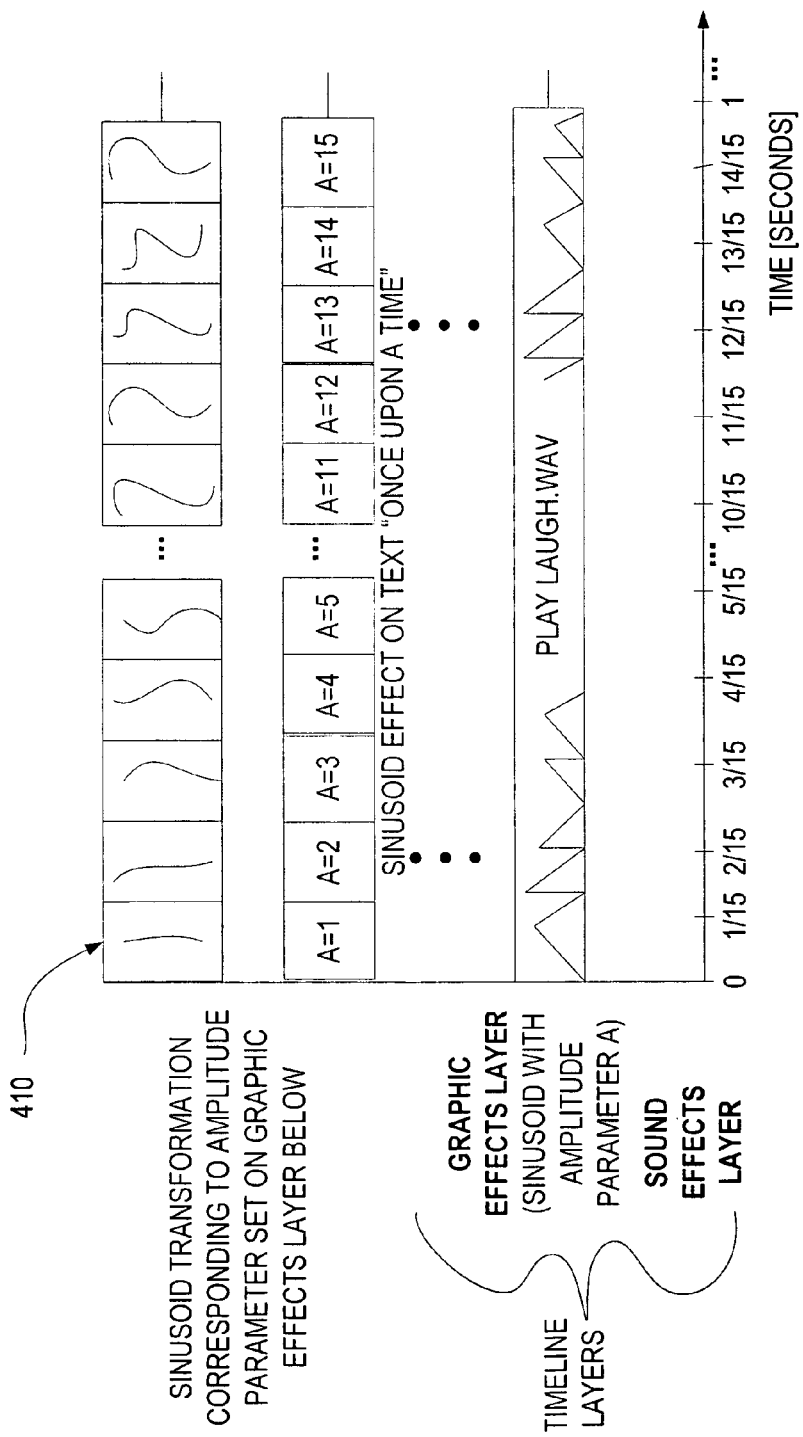
FIG. 11 is a diagram for one implementation of the system of FIG. 2 illustrating an exemplary sinusoid transformation.
Figure 12:
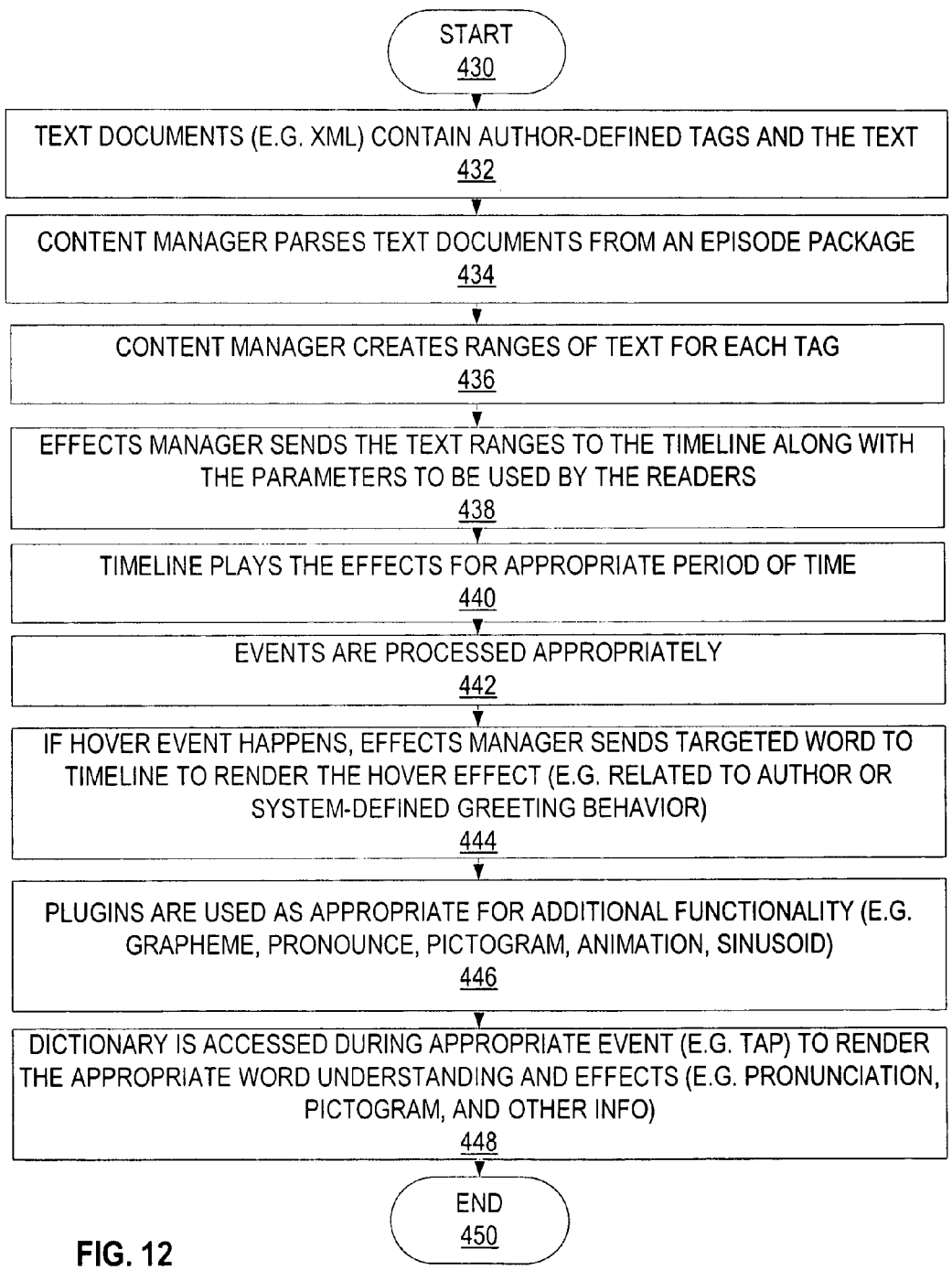
FIG. 12 is a process flow diagram for one implementation of the system of FIG. 2 illustrating the stages involved in customizing the user experience using content in external files.

Turning now to FIGS. 10-30, with continued reference to FIG. 2, process flow diagrams, logical diagrams, and sample file contents are described to illustrate how the user experience for the fonts with feelings can be customized by a designer, educator, developer, and/or other person. FIG. 10 is a diagrammatic view illustrating the components that allow customization of the user experience. FIG. 12 is a flow diagram describing the operation of FIG. 10 in further detail. In one form, the process of FIG. 12 is at least partially implemented in the operating logic of computing device 100. FIGS. 10 and 12 will be referred to simultaneously for the sake of clarity.

Episode package 370 includes text behavior documents 372, such as XML documents, and embedded resources, such as laugh.wav media file 376. While the examples shown in some of the figures illustrate media files being .wav media files, these are just examples. Numerous other types of media files could also be used, such as .mp3 or any other media file type. In one implementation, the text behavior documents 372 can include author-defined XML tags or other settings that allow the author to describe the custom behavior of the text (stage 432). The settings can be used for the different text experiences within system 100 from the text within a comic book, a child's book, the text of an instant message, the text of a sign, and/or the text of a karaoke song, to name a few non-limiting examples. Episode package also includes episode description documents 374, such as in an XML format. The terms experience package and/or episode package as used herein are meant generically to describe a way of customizing instructional fonts, whether or not the content is organized into experiences or episodes. Thus, the term episode package as described in the following examples could include any combination of one or more settings files, database files, and/or other scenarios that allow customization of instructional fonts.

The episode package is supplied to the content manager 378, which communicates with the effects manager 380 at appropriate times. The content manager 378 parses the text behavior documents 372 from episode package 370 (stage 434) and creates ranges of text for each setting (e.g. tag) in the text behavior documents 372 (stage 436). The effects manager sends the text ranges to the timeline 396 along with the parameters to be used by the renderers 398 (stage 438). While the example in FIG. 10 uses a timeline for animations, other types of animation methods could be used in other implementations. Sound effects 400 are played on speakers 402. The example transformation 410 in FIG. 11 shows the text range "Once upon a time" using the sinusoid renderer along with an amplitude of 15 pixels. Timeline 396 then plays the effects for the appropriate amount of time (stage 440), which in this example, is the sinusoid transformation and laugh.wav for one second.

Events are processed appropriately (stage 442), such as stylus events (hover and/or tap) 384, speech events 386, and/or programmatic events 390. Stylus events are detected from an input device on display 394. Speech events 386 are detected from microphone array 388. Programmatic events 390 can be fired based upon particular content 392. When a hover event happens, the effects manager 380 sends the targeted word to the timeline 396 to render the hover effect with renderer 398 (stage 444). The hover event can be related to author and/or system-defined greeting behavior. Plugins are used as appropriate for additional functionality (stage 446). Non-limiting examples of plugins include a grapheme, word pronounciation, pictogram, animation, and/or sinusoid. The dictionary 404 is accessed during the appropriate event (e.g. tap) to render the appropriate word understanding and effects (stage 448). A few non-limiting examples of when the dictionary 404 is used includes retrieving word pronunciations, pictograms of words, and/or other information (stage 448). The process then ends at end point 450.

Figure 13:
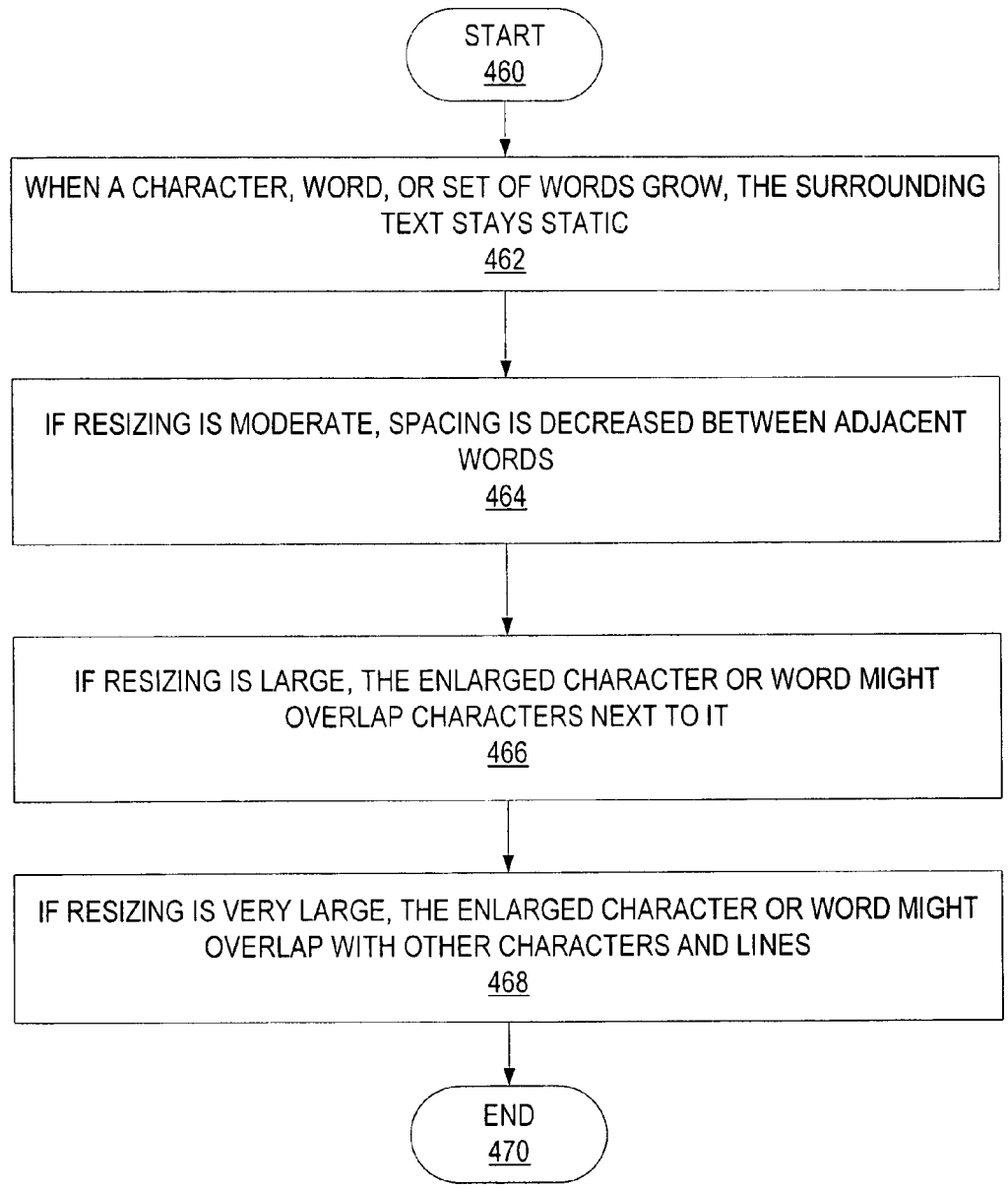
FIG. 13 is a process flow diagram for one implementation of the system of FIG. 2 illustrating the stages involved in resizing the words based on user interaction.

FIG. 13 illustrates the stages involved in resizing the words based on user interaction in one implementation, and FIGS. 14-17 illustrate simulated screens based on the respective resizing stages. In one form, the process of FIG. 13 is at least partially implemented in the operating logic of computing device 100. The process begins at start point 460 with a character, word, or set of words growing with the surrounding text staying static (stage 462 on FIG. 13, 480 on FIG. 14). If resizing is moderate, spacing can be decreased between adjacent words (stage 464 on FIG. 13, 482 on FIG. 15). If resizing is large, the enlarged character or word might overlap the characters next to it (stage 466 on FIG. 13, 484 on FIG. 16). If resizing is very large, the enlarged character or word might overlap with other characters and lines (stage 468 on FIG. 13, 486 on FIG. 17). Then process then ends with end point 470.

Figure 18:
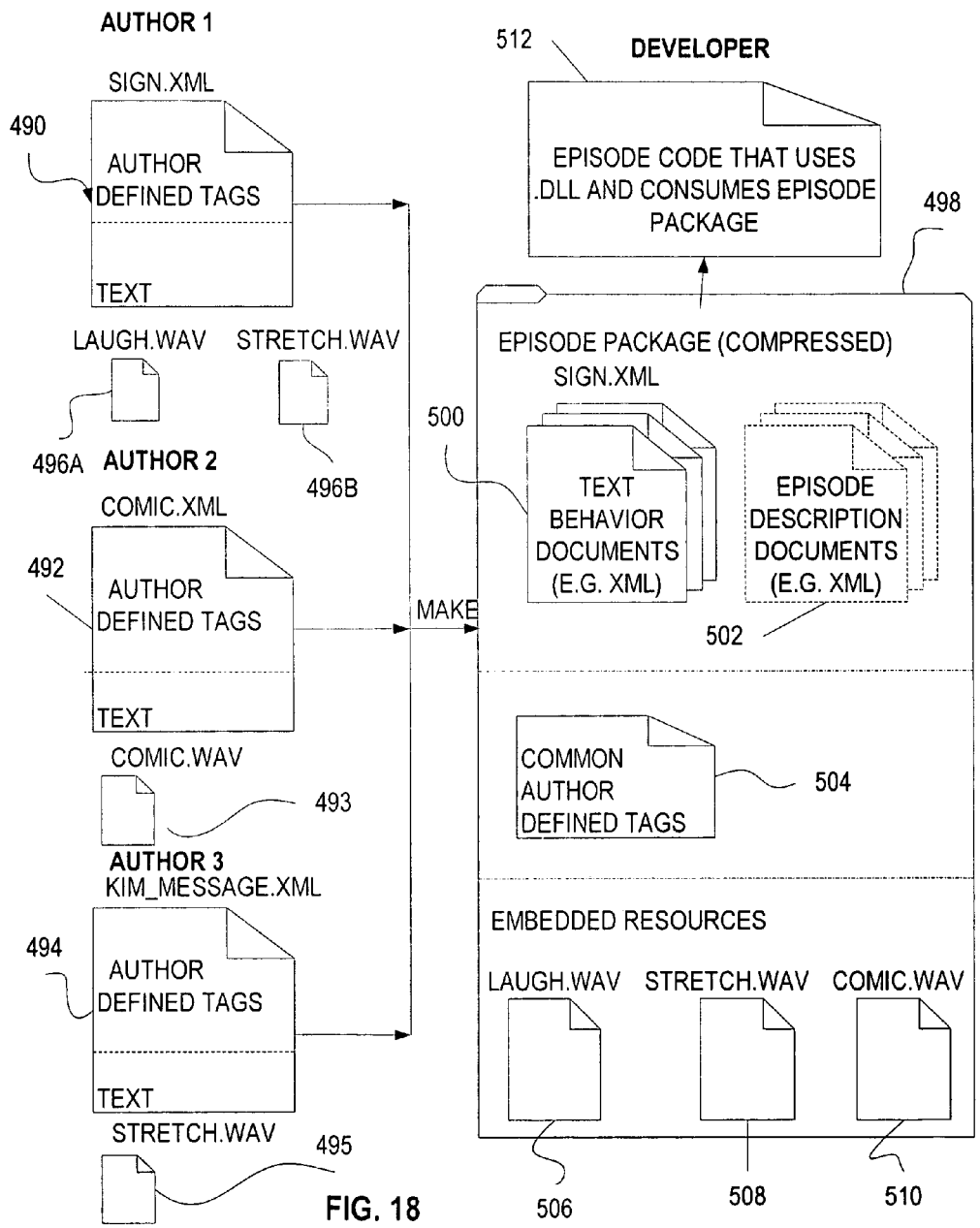
FIG. 18 is a diagrammatic view for one implementation of the system of FIG. 2 illustrating content being authored by multiple authors and used in customizing the user experience.

Turning now to FIG. 18, a diagrammatic view for one implementation of system 100 illustrates the content being authored by multiple authors and used in customizing the user experience with the fonts with feelings. Suppose multiple authors create multiple XML files 490, 492, and 494. Two media files 496A and 496B are supplied by the first author along with XML file 490. Media file 493 is supplied by author 2 along with XML file 492. Media file 495 is supplied by author 3 along with XML file 494. These various files are included in an episode package 498 as part of a user experience. For example, documents 490, 492, and 494 are included in the episode package 498 as text behavior documents 500. Media files 496A, 496B, 493, and 495 are included as embedded resources 506, 508, and 510. Common author defined tags 504 are included in the episode package 498, along with episode description documents 502. The episode package 498 is used by the episode dynamic link library or other program 512 created by the developer to operate on system 100.

Figure 19:
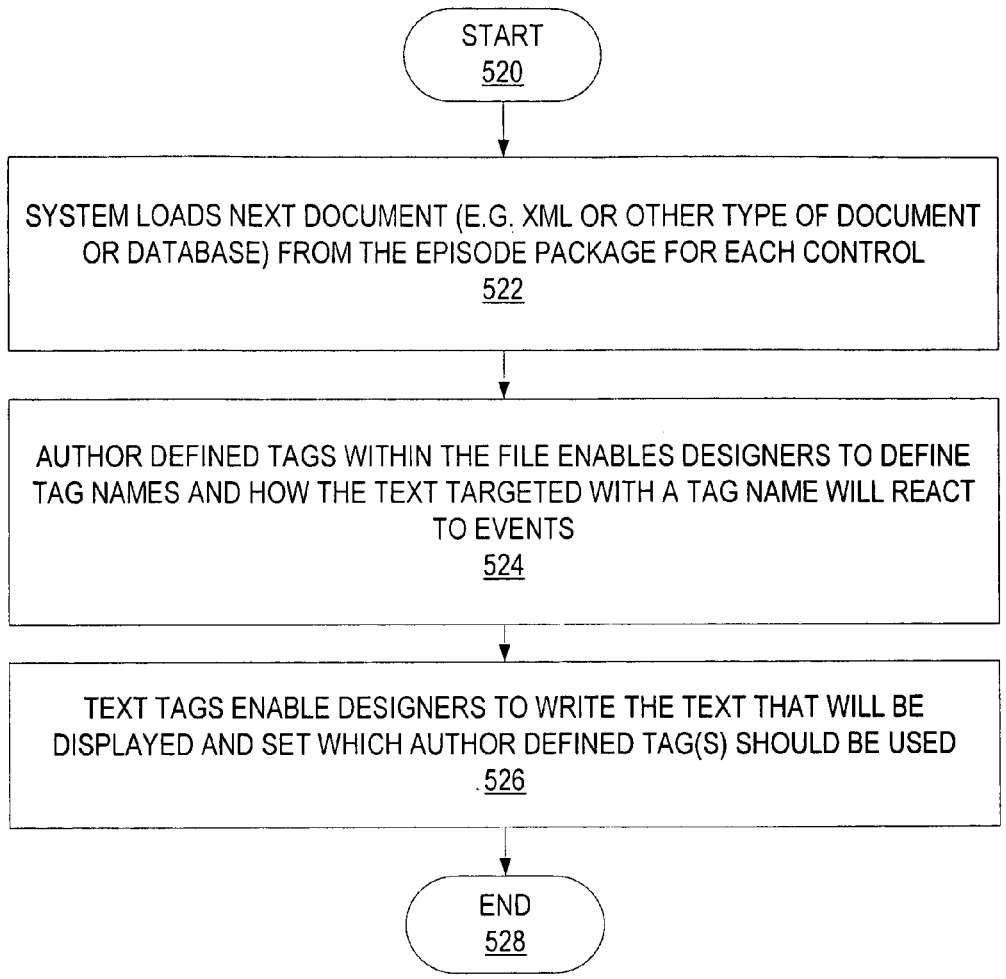
FIG. 19 is a process flow diagram for one implementation of the system of FIG. 2 illustrating the stages involved in customizing and processing events.

FIG. 19 illustrates the stages involved in customizing and processing events. In one form, the process of FIG. 19 is at least partially implemented in the operating logic of computing device 100. The process begins at start point 520 where the system loads a document (e.g. XML or other type of document or database) from the episode package for each control (stage 522). The author defined tags within the file enable designers to define tag names and how the text that is targeted with a tag name will react to the events (stage 524). The text tags enable designers to write the text that will be displayed and set which author defined tag(s) should be used (stage 526). The process then ends at end point 528.

Turning now to FIG. 20-27, a simulated example will now be described to illustrate the customizable user experience environment of FIG. 10 in further detail. FIG. 20 is a diagram illustrating a sample XML text file 530 used in one implementation of system 100. In one implementation, XML text file 530 can be supplied by a user such as a font designer and/or educator. In another implementation, XML text file 530 can be supplied by a developer. In yet other implementations, other types of files are used, such as non-text files and/or relational databases.

Figure 21:
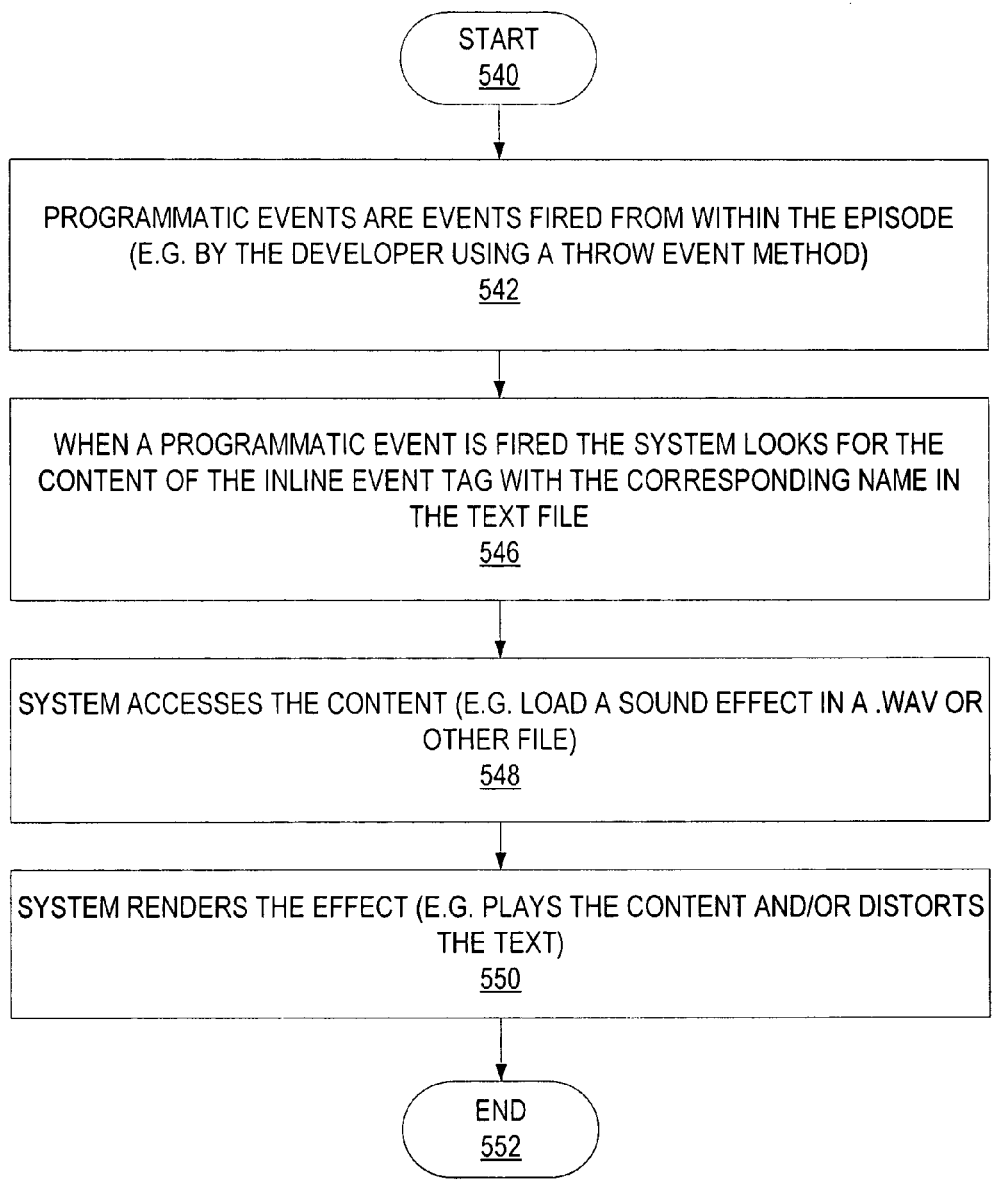
FIG. 21 is a process flow diagram for one implementation of the system of FIG. 2 illustrating the stages involved in processing programmatic events.
Figure 22:
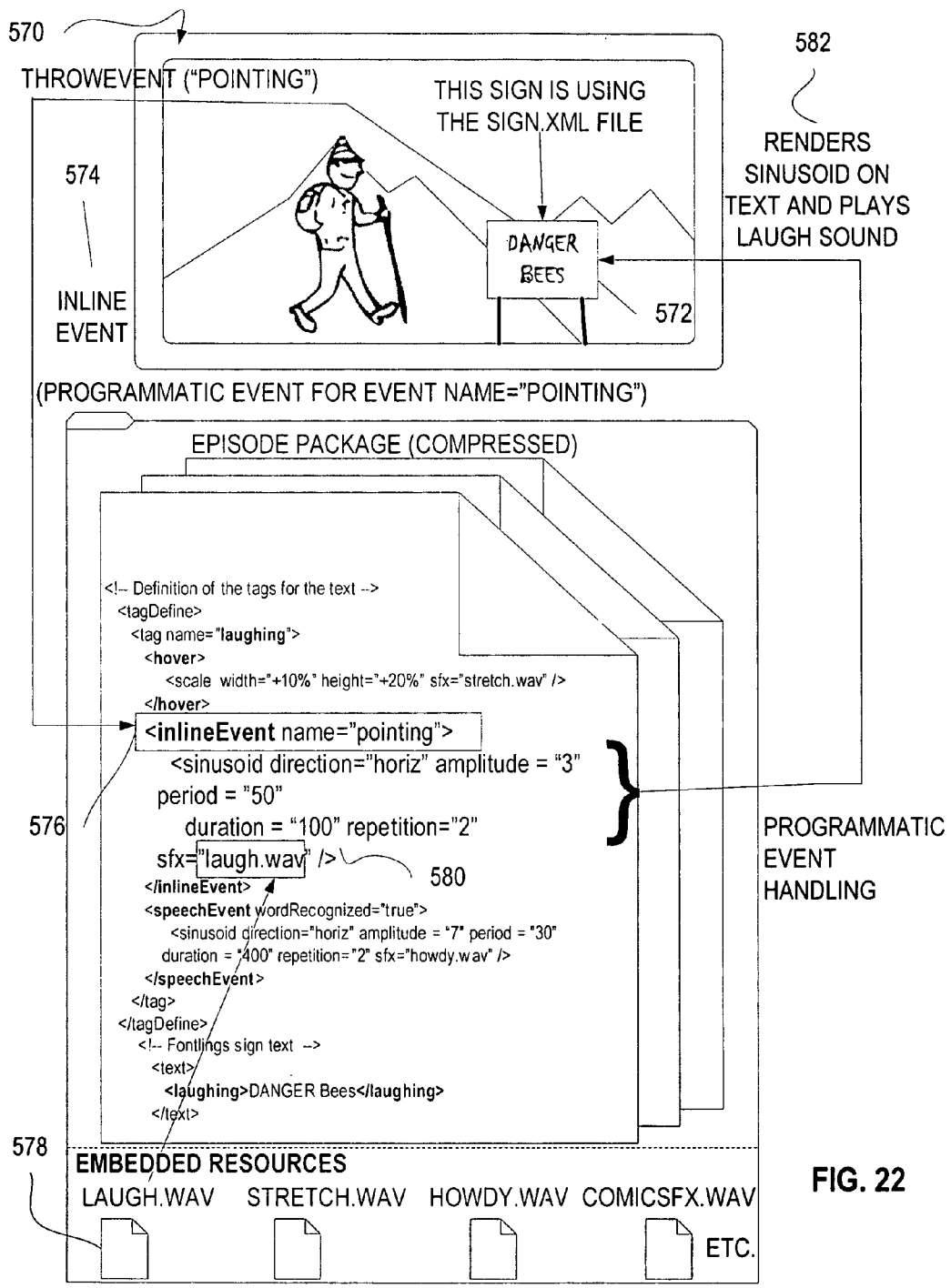
FIG. 22 is a logical diagram for one implementation of the system of FIG. 2 and the stages of FIG. 21 illustrating an exemplary programmatic event being processed.

FIGS. 21 and 22 illustrate the stages involved in processing programmatic events, and are referred to simultaneously for the sake of clarity. In one form, the process of FIG. 21 is at least partially implemented in the operating logic of computing device 100. The process begins at start point 540 with programmatic events being events fired from within the episode 570, such as by the developer using a throw event method (stage 542). When a programmatic event 574 is fired, such as from the user pointing a stylus over some words in the episode 572, the system looks for the content of the inline event tag with the corresponding name in the text file 576 (stage 546). The system accesses the content 580, such as loading a sound effect in a .wav or other file 578 (stage 548). The system renders the media effect 582 (e.g. plays the content and/or distorts the text) (stage 550). The process then ends at end point 552.

Figure 23:
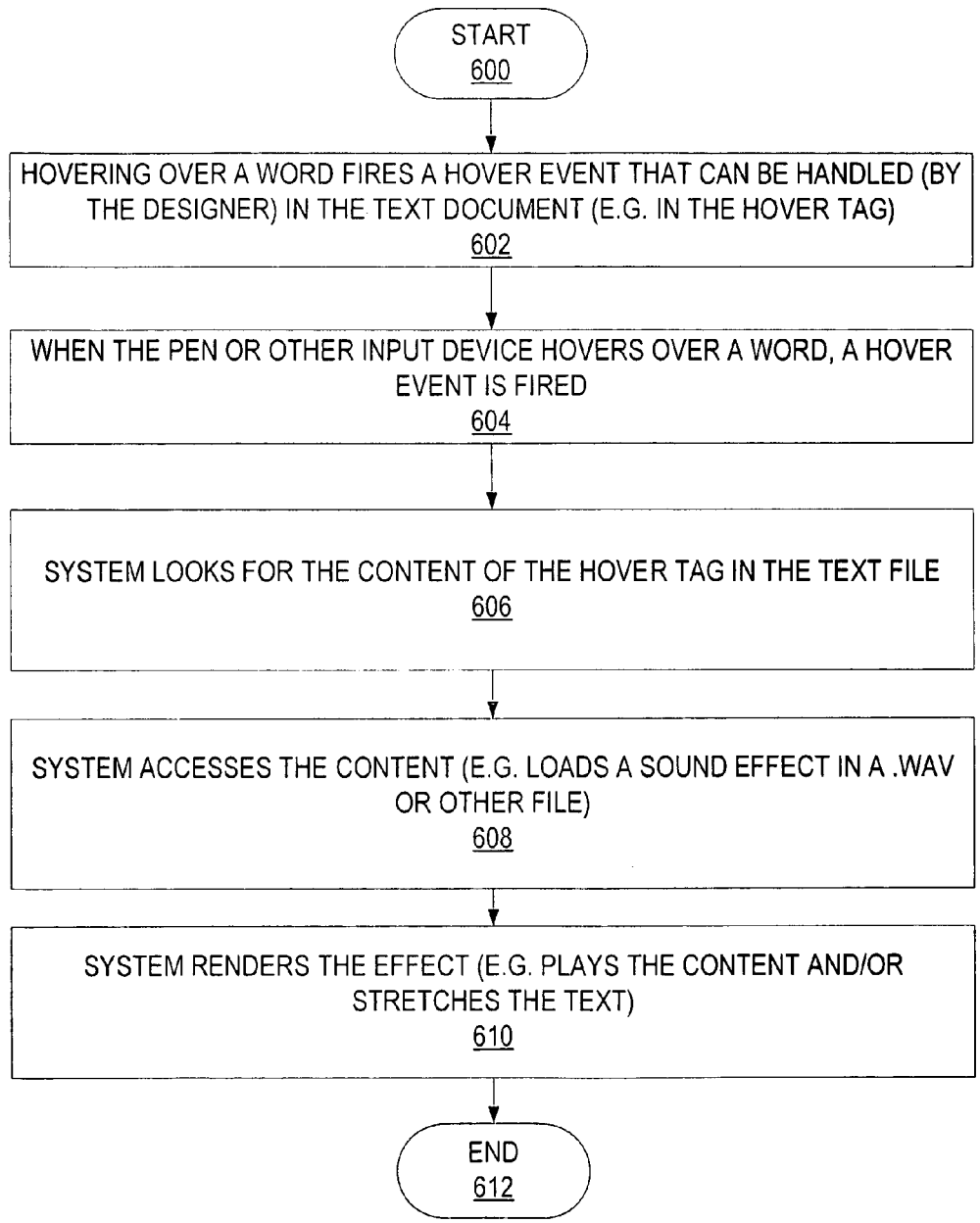
FIG. 23 is a process flow diagram for one implementation of the system of FIG. 2 illustrating the stages involved processing hover events.
Figure 24:
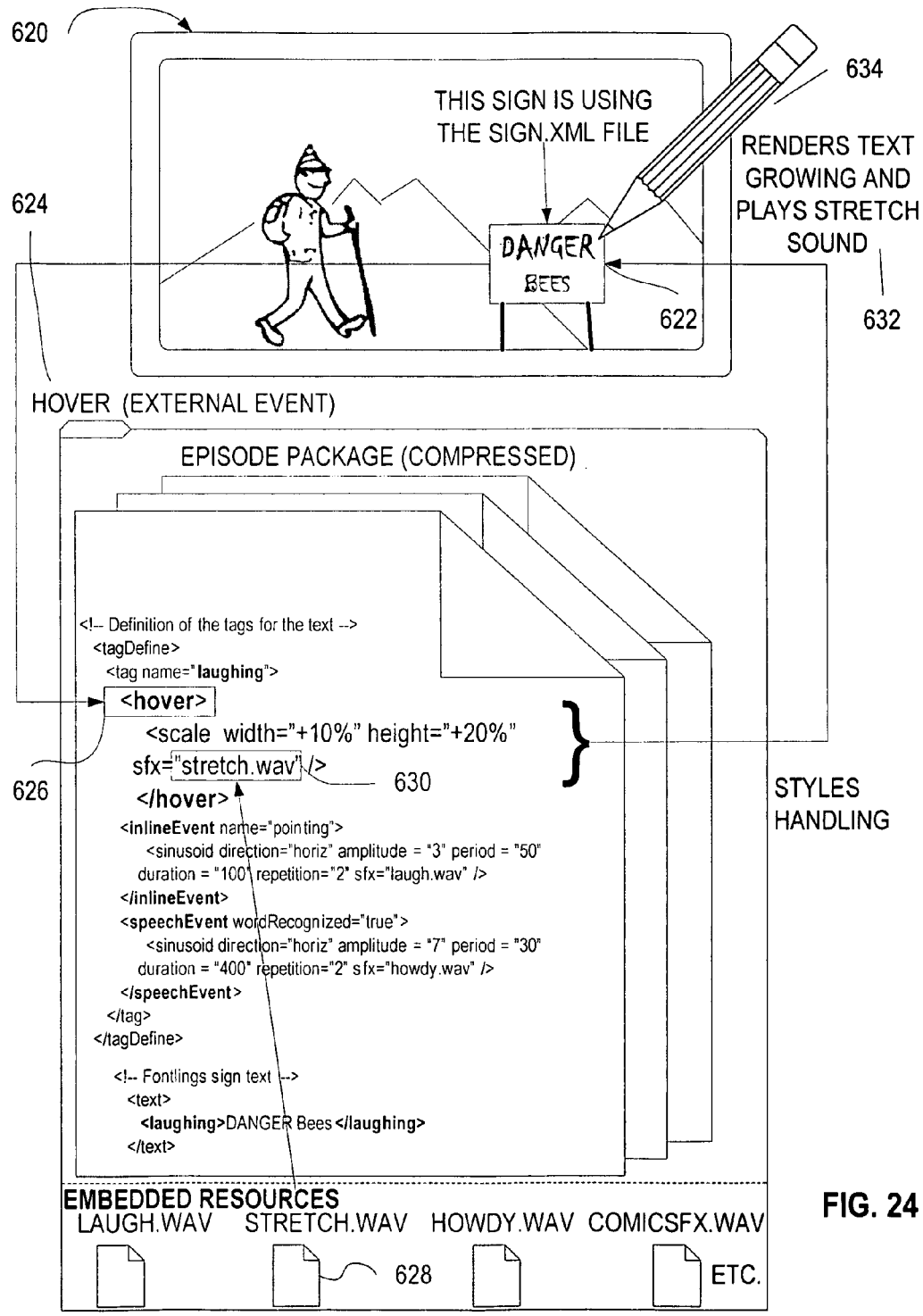
FIG. 24 is a logical diagram for one implementation of the system of FIG. 2 and the stages of FIG. 23 illustrating an exemplary hover event being processed.

FIGS. 23 and 24 illustrates the stages involved in processing hover events, and are described simultaneously for the sake of clarity. In one form, the process of FIG. 23 is at least partially implemented in the operating logic of computing device 100. The process begins at start point 600 when hovering over a word 622, such as within episode 620, fires a hover event 624 that can be handled (by the designer) in the text document (e.g. in the hover tag 626) (stage 602). When the pen or other input device 634 hovers over a word, a hover event is fired (stage 604). The system looks for the content 630 of the hover tag 626 in the text file (stage 606). The system accesses the content 628 (e.g. loads a media or sound effect in a .wav or other file) (stage 608). The system renders the effect (e.g. plays the content and/or stretches the text 632) (stage 610). The process then ends at end point 612.

Figure 25:
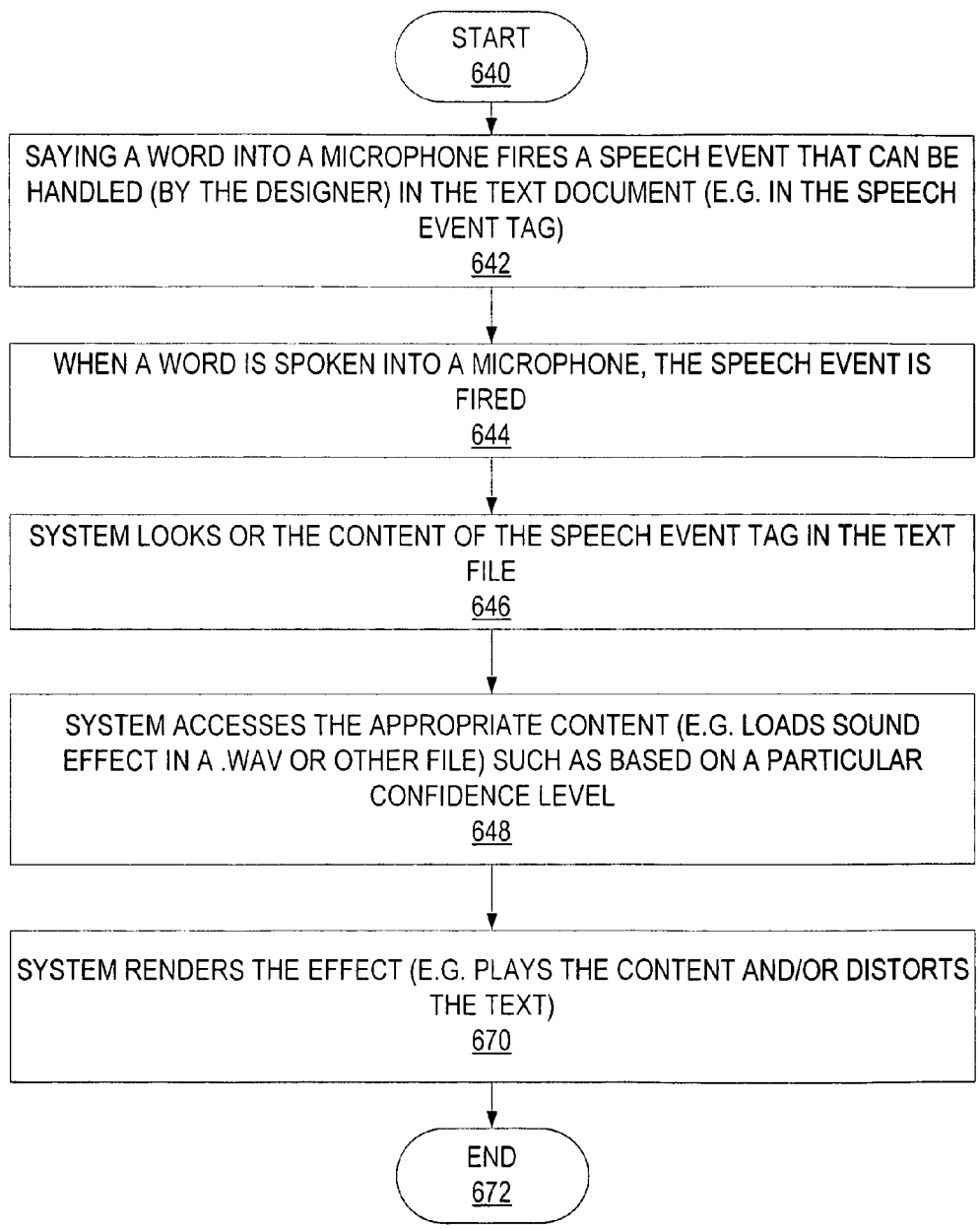
FIG. 25 is a process flow diagram for one implementation of the system of FIG. 2 illustrating the stages involved in processing a speech event.
Figure 26:
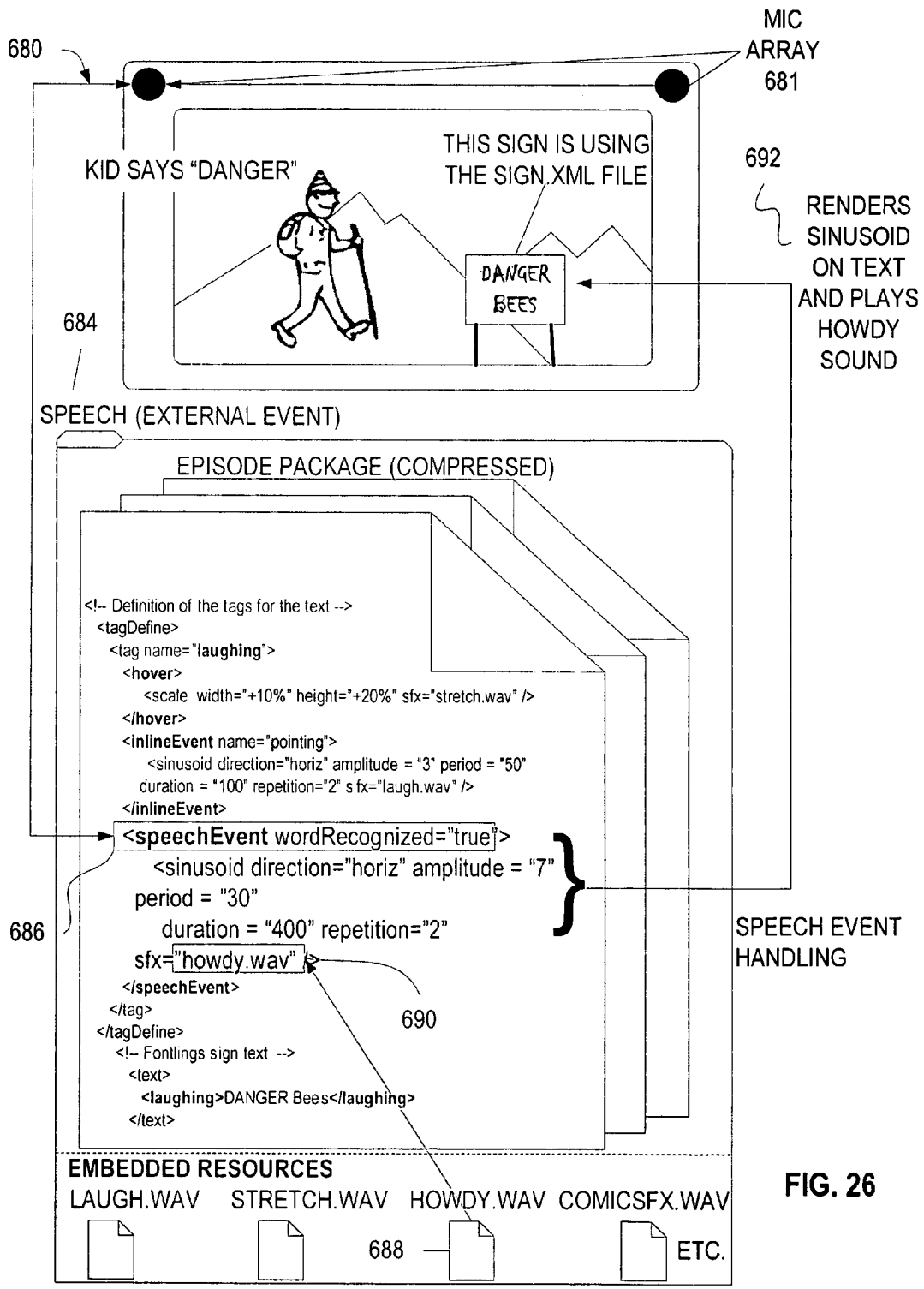
FIG. 26 is a logical diagram for one implementation of the system of FIG. 2 and the stages of FIG. 25 illustrating an exemplary speech event being processed.

FIGS. 25 and 26 illustrate the stages involved in processing a speech event, and are described simultaneously for the sake of clarity. In one form, the process of FIG. 25 is at least partially implemented in the operating logic of computing device 100. The process begins at start point 640 with the user (such as the child) viewing an episode 680 speaking a word into microphone 681 to fire a speech event 684 that can be handled in the text document (stage 642). When a word is spoken into microphone 681, the speech event 684 is fired (stage 644). The system looks for the content 690 of the speech event tag 686 in the text file (stage 646). The system accesses the appropriate content 688 (e.g. loads a media or sound effect in a .wav or other file) such as based on a particular confidence level (stage 648). The system renders the effect 692 (e.g. plays the content and/or distorts the text) (stage 670). The process then ends at end point 672.

Figure 27:
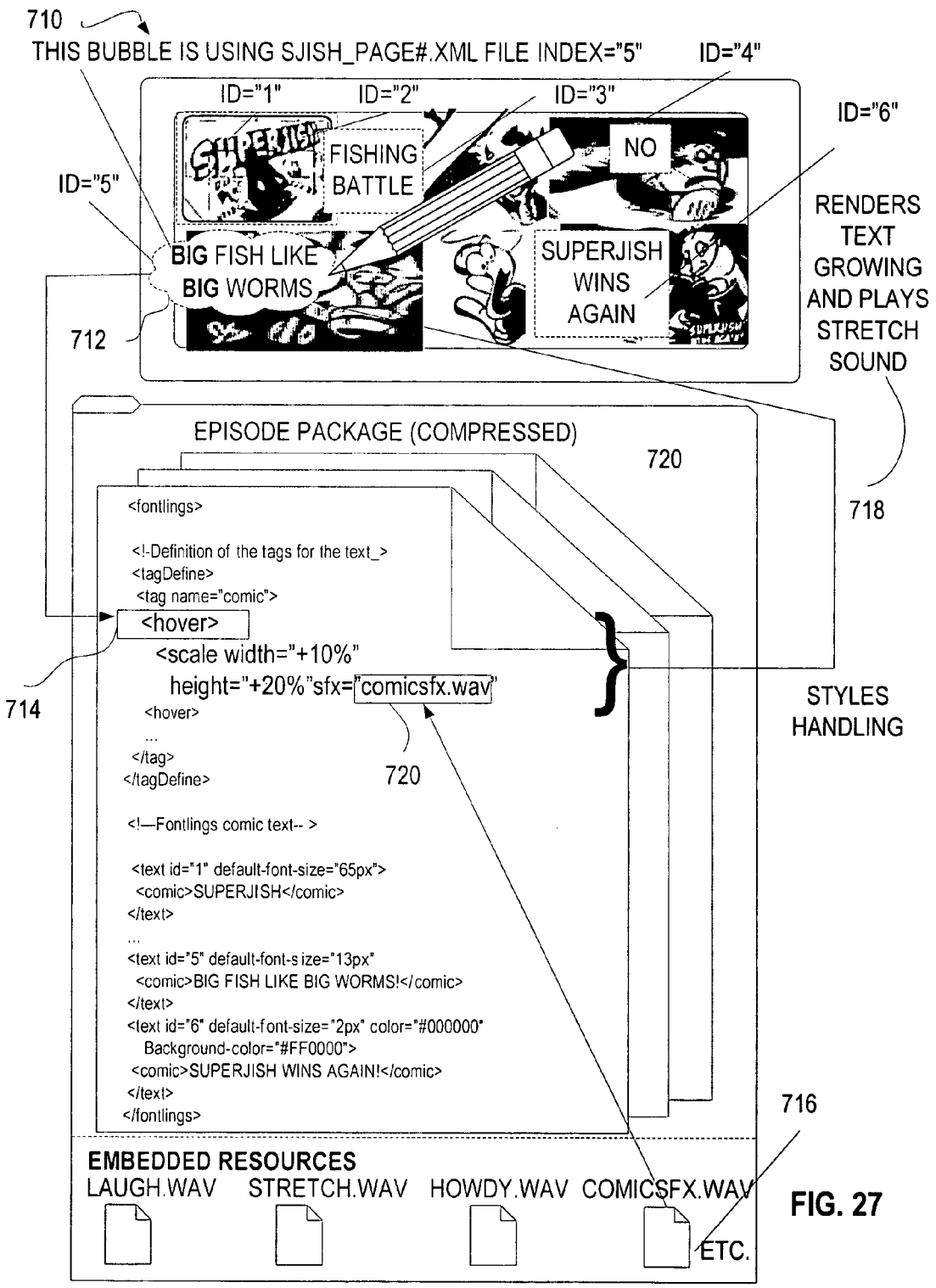
FIG. 27 is a logical diagram for one implementation of the system of FIG. 2 illustrating an exemplary event being processed for a comic.

FIG. 27 is a logical diagram for an exemplary event being processed for a comic strip. The episode 710 is displayed to a user. When the user hovers over words 712, such as using a stylus or mouse, the hover event fires. The hover tag 714 in the XML file is accessed to determine what external content 720 should be played or displayed. In this example, comicsfx.wav file 716 is played, and the text is rendered as growing 718.

Figure 28:
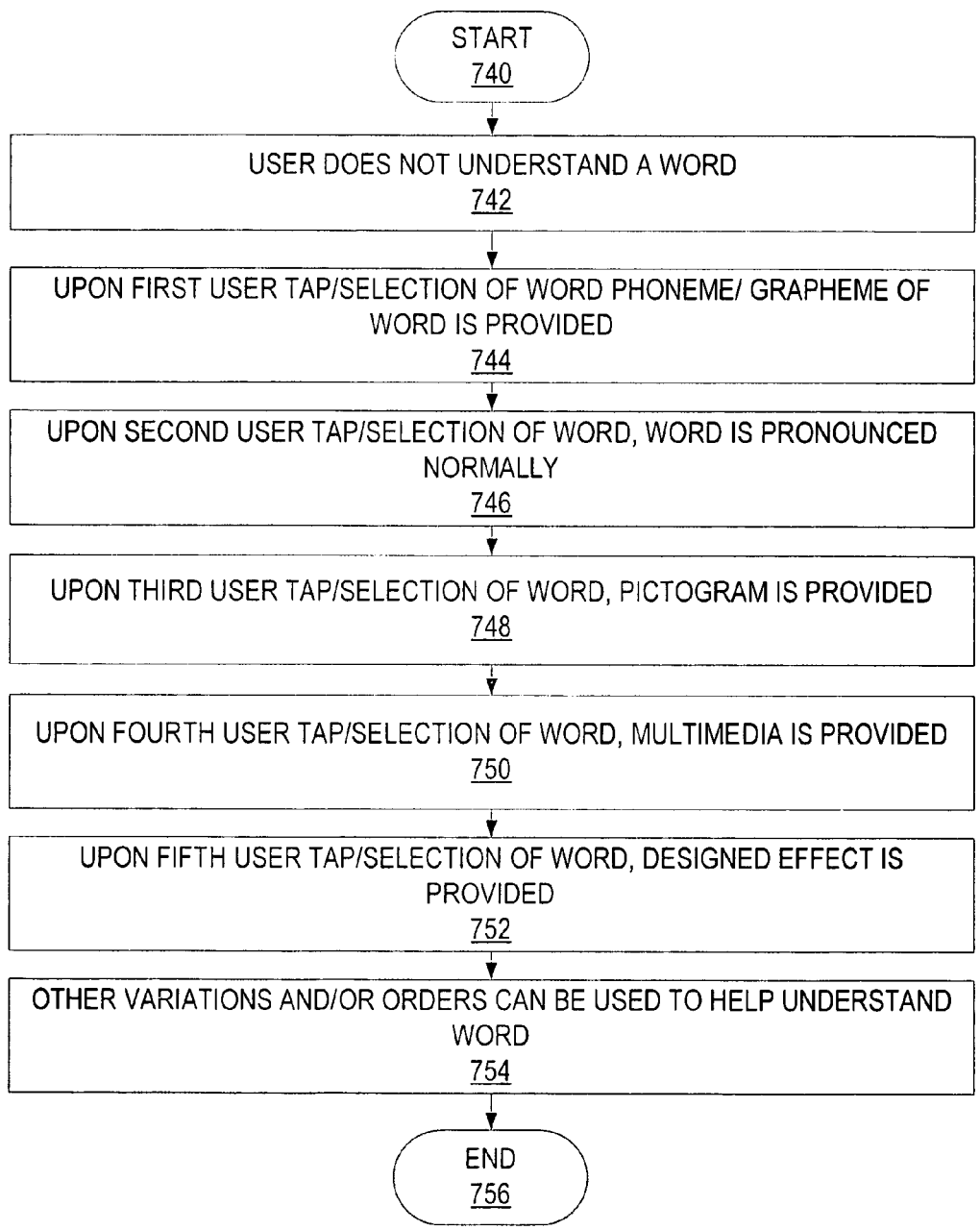
FIG. 28 is a process flow diagram for one implementation of the system of FIG. 2 illustrating the stages involved helping a user understand a word.

FIG. 28 illustrates the stages involved in helping a user understand a word. In one form, the process of FIG. 28 is at least partially implemented in the operating logic of computing device 100. The process begins at start point 740 with the system determining that the user does not understand a word (stage 742). Upon a first user tap/selection of the word, a phoneme/grapheme of the word is provided (stage 744). Upon a second user tap/selection of the word, the word is pronounced normally (stage 746). Upon a third user tap/selection of the word a pictogram is provided (stage 748). Upon the fourth user tap/selection of the word, multimedia is provided (stage 750). Upon a fifth user tap/selection of the work, a designed effect, such as one supplied by the designer in the text file, is provided (stage 752). Other variations and/or orders of these stages, fewer stages, and/or additional stages can be used to help the user understand the word (stage 754). The process then ends at end point 756.

Figure 29:
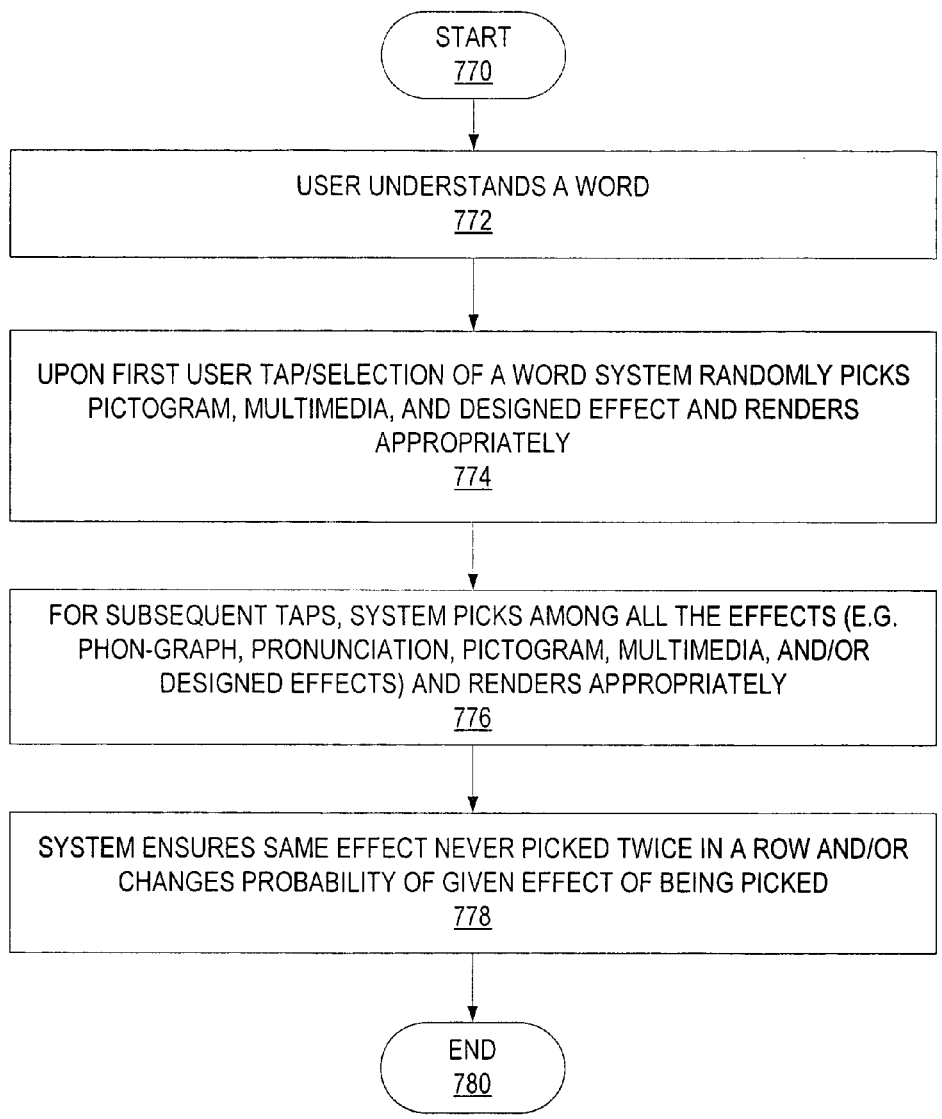
FIG. 29 is a process flow diagram for one implementation of the system of FIG. 2 illustrating the stages involved helping a user reinforce an understanding they already have of a word.

FIG. 29 illustrates the stages involved in helping a user reinforce and understanding they already have of a word. In one form, the process of FIG. 29 is at least partially implemented in the operating logic of computing device 100. The process begins at start point 770 with the user understanding a word (stage 772). Upon the first user tap/selection of a word, the system randomly picks a pictogram, multimedia effect, or designed effect and renders it appropriately (stage 774). For subsequent tap/selections, the system picks randomly among all of the effects (e.g. phonograph, pronunciation, pictogram, multimedia, and/or designed effects) and renders the selected one appropriately (stage 776). The system ensures the same effect is never picked twice in a row and/or changes probability of a given effect of being picked (stage 778). Other variations and/or orders of these stages, fewer stages, and/or additional stages can be used to help the user solidify his/her understanding of the word. The process then ends at end point 780.

Figure 30:
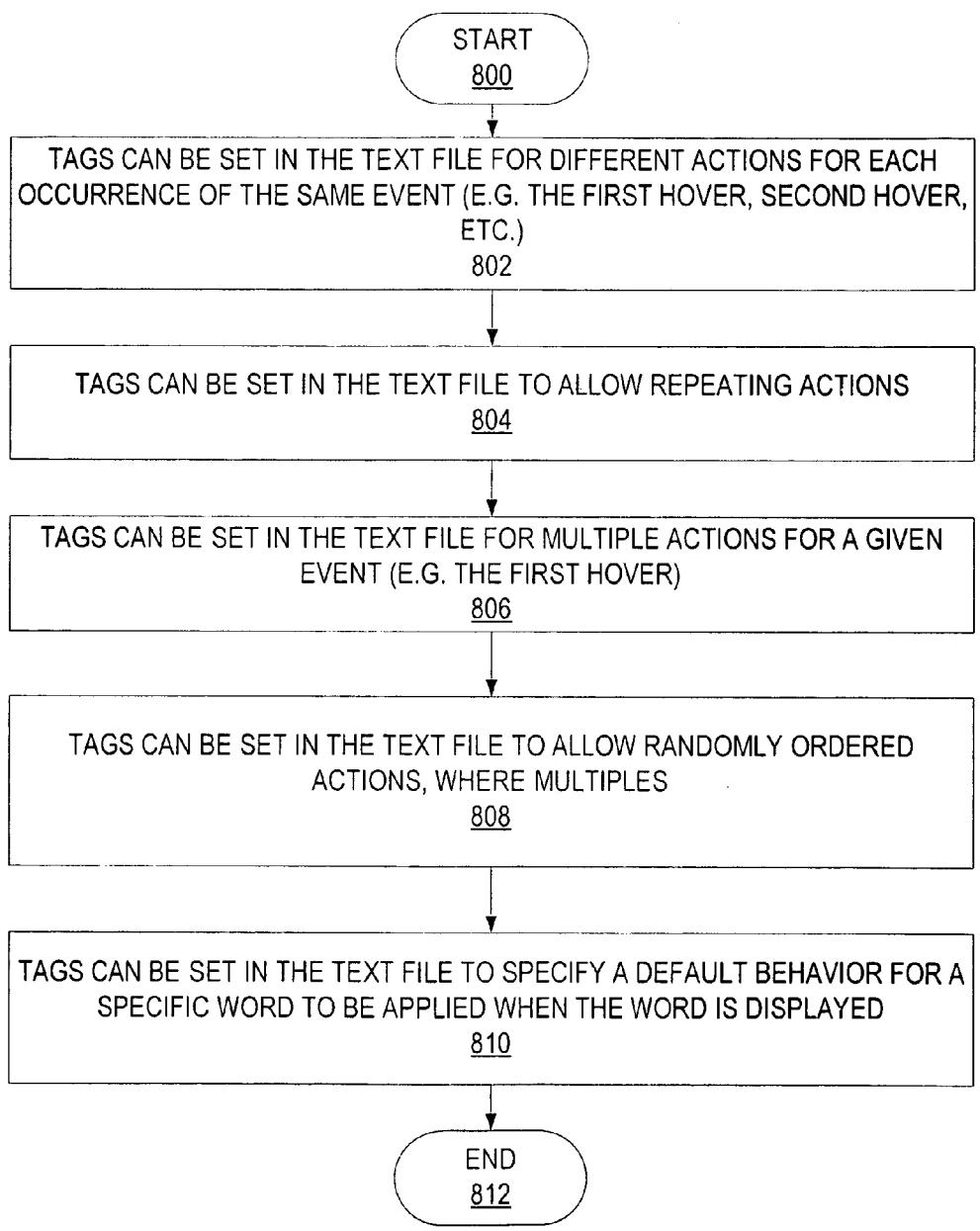
FIG. 30 is a process flow diagram for one implementation of the system of FIG. 2 illustrating the stages involved in setting some exemplary types of tags in the settings files for customizing the actions.

FIG. 30 illustrates the stages involved in setting some exemplary tags in the settings files. In one form, the process of FIG. 30 is at least partially implemented in the operating logic of computing device 100. The process begins at start point 800 with the tags being set in the text file for different actions for each occurrence of the same event (e.g. the first hover, the second hover, etc.) (stage 802). The tags can be set in the text file to allow repeating actions (stage 804). The tags can be set in the text file for multiple actions for a given event (e.g. the first hover) (stage 806). The tags can be set in the text file to allow randomly ordered actions, where multiple actions are involved (stage 808). The tags can be set in the text file to specify a default behavior for a specific word to be applied when the word is displayed (stage 810). The process then ends at end point 812.

While the illustrative examples described herein used XML text files to explain the concepts in further detail, it will be appreciated that other types of files and/or databases could be used for storing the settings for customizing the user experience. The episodes described in FIGS. 22, 24, 26, and 27 are merely illustrative examples of how the system operates in one implementation and are not limiting in nature. Furthermore, while the examples described herein focused on scenarios best suited for teaching word understanding and/or language skills to children, it will be appreciated in other implementations, the techniques discussed herein can be used in programs primarily accessed by adults, such as word processing and other programs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable medium having computer-executable instructions for causing a computer to perform steps comprising:
    providing an application having at least one word in at least one font;
    upon an interaction with the word by a user, determining that an event has occurred, identifying an output that is associated with the event in a markup language document, and providing the output; and
    repeating the providing the output for each of a plurality of interactions
    responsive to receiving an indication that the user does not fully understand the word,
    wherein repeating the providing the output comprises during a first interaction of the plurality of interactions, providing a phoneme pronunciation of the word, during a second interaction of the plurality of interactions, providing a normal pronunciation of the work, during a third interaction of the plurality of interactions, providing a pictogram of the word, during a fourth interaction of the plurality of interactions, providing a multimedia representation of the word, and during a fifth interaction of the plurality of interactions, providing a designed effect for the word; and
    wherein a set of data related to the interaction with the word by the user is stored in a data store.

2. The computer-readable medium of claim 1, wherein at least one of the interactions is a hover over the word with an input device.

3. The computer-readable medium of claim 1, wherein at least one of the interactions is a selection of the word with an input device.

4. The computer-readable medium of claim 1, wherein the designed effect is custom designed by a designer.

5. The computer-readable medium of claim 1, further comprising the steps of:
    recognizing that the user understands the word; and
    during each interaction of the plurality of interactions, randomly providing the output selected from the group consisting of: the phoneme pronunciation of the word, the normal pronunciation of the word, the pictogram of the word, the multimedia representation of the word, and the designed effect for the word.

6. The computer-readable medium of claim 5, further comprising the steps of:
    ensuring that a same output is not repeated two interactions in a row.

7. A method, comprising:
    providing an application having at least one word in at least one font;
    upon an interaction with the word by a user, determining that an event has occurred, identifying an output that is associated with the event in a markup language document, and providing the output; and
    repeating the providing the output for each of a plurality of interactions responsive to an indication that the user does not fully understand the word, wherein repeating the providing the output comprises during a first interaction of the plurality of interactions, providing a phoneme pronunciation of the word, during a second interaction of the plurality of interactions, providing a normal pronunciation of the work, during a third interaction of the plurality of interactions, providing a pictogram of the word, during a fourth interaction of the plurality of interactions, providing a multimedia representation of the word, and during a fifth interaction of the plurality of interactions, providing a designed effect for the word;
    wherein a set of data related to the interaction with the word by the user is stored in a data store; and
    wherein at least one of the providing the application, determining that the event has occurred, and the providing the output steps is performed by a processing unit.

8. The method of claim 7, wherein at least one of the interactions is a hover over the word with an input device.

9. The method of claim 7, wherein at least one of the interactions is a selection of the word with an input device.

10. The method of claim 7, wherein the designed effect is custom designed by a designer.

11. The method of claim 7, further comprising the steps of:
    recognizing that the user understands the word; and
    during each interaction of the plurality of interactions, randomly providing the output selected from the group consisting of: the phoneme pronunciation of the word, the normal pronunciation of the word, the pictogram of the word, the multimedia representation of the word, and the designed effect for the word.

12. The method of claim 7, further comprising the steps of:
    ensuring that a same output is not repeated two interactions in a row.

13. A system, comprising:
    a memory that stores instructions; and
    a processing unit that executes the instructions stored in the memory to perform steps including:
        providing an application having at least one word in at least one font;
        upon an interaction with the word by a user, determining that an event has occurred, identifying an output that is associated with the event in a markup language document, and providing the output; and
        repeating the providing the output for each of a plurality of interactions responsive to an indication that the user does not fully understand the word, wherein repeating the providing the output comprises during a first interaction of the plurality of interactions, providing a phoneme pronunciation of the word, during a second interaction of the plurality of interactions, providing a normal pronunciation of the work, during a third interaction of the plurality of interactions, providing a pictogram of the word, during a fourth interaction of the plurality of interactions, providing a multimedia representation of the word, and during a fifth interaction of the plurality of interactions, providing a designed effect for the word; and a data store accessible to the processing unit that stores a set of data related to the interaction with the word by the user.

14. The system of claim 13, wherein at least one of the interactions is a hover over the word with an input device.

15. The system of claim 13, wherein at least one of the interactions is a selection of the word with an input device.

16. The system of claim 13, wherein the designed effect is custom designed by a designer.

17. The system of claim 13, wherein the processing unit executes the instructions stored in the memory to perform additional steps including:

recognizing that the user understands the word; and during each interaction of the plurality of interactions, randomly providing the output selected from the group consisting of: the phoneme pronunciation of the word, the normal pronunciation of the word, the pictogram of the word, the multimedia representation of the word, and the designed effect for the word.

18. The system of claim 17, wherein the processing unit executes the instructions stored in the memory to perform additional steps including:

ensuring that a same output is not repeated two interactions in a row.

* * * * *